US012437888B2

(12) United States Patent
Venneri et al.

(10) Patent No.: US 12,437,888 B2
(45) Date of Patent: Oct. 7, 2025

(54) NUCLEAR REACTOR CORE ARCHITECTURE WITH MODERATOR ELEMENTS INSIDE INSULATOR ELEMENTS

(71) Applicant: LOKI MMR INC., New York, NY (US)

(72) Inventors: Paolo Francesco Venneri, Seattle, WA (US); Michael John Eades, Seattle, WA (US); Kelsey Souza, Seattle, WA (US); Wesley Deason, Seattle, WA (US)

(73) Assignee: LOKI MMR INC., New York, NY (US)

( * ) Notice: Subject to any disclaimer, the term of this patent is extended or adjusted under 35 U.S.C. 154(b) by 371 days.

(21) Appl. No.: 17/640,033

(22) PCT Filed: Oct. 4, 2020

(86) PCT No.: PCT/US2020/054190
§ 371 (c)(1),
(2) Date: Mar. 3, 2022

(87) PCT Pub. No.: WO2021/067903
PCT Pub. Date: Apr. 8, 2021

(65) Prior Publication Data
US 2022/0301732 A1    Sep. 22, 2022

Related U.S. Application Data

(60) Provisional application No. 62/910,561, filed on Oct. 4, 2019.

(51) Int. Cl.
*G21C 11/02* (2006.01)
*G21C 5/12* (2006.01)
(Continued)

(52) U.S. Cl.
CPC .............. *G21C 11/022* (2013.01); *G21C 5/12* (2013.01); *G21C 7/12* (2013.01); *G21D 5/02* (2013.01);
(Continued)

(58) Field of Classification Search
CPC .......... G21C 11/022; G21C 7/12; G21C 7/24; G21C 9/02; G21C 11/06; G21C 13/02;
(Continued)

(56) References Cited

U.S. PATENT DOCUMENTS 3,129,140 A    4/1964  Stohr et al.
4,569,820 A    2/1986  Fortescue
(Continued)

FOREIGN PATENT DOCUMENTS

GB        963565 A    7/1964

OTHER PUBLICATIONS

The extended European Search Report issued Feb. 16, 2024, by the European Patent Office in corresponding European Patent Application No. 20871765.2-1212. (8 pages).
(Continued)

*Primary Examiner* — Jack W Keith
*Assistant Examiner* — Daniel Wasil
(74) *Attorney, Agent, or Firm* — Sikand IP Law PLLC

(57) ABSTRACT

An enhanced architecture for a nuclear reactor core includes: (1) nuclear fuel tiles (S-Block); and (2) a thermal insulator and tube liners with a solid-phase moderator (U-Mod) to improve safety, reliability, heat transfer, efficiency, and compactness. In S-Block, nuclear fuel tiles include a fuel shape designed with an interlocking geometry pattern to optimize heat transfer between nuclear fuel tiles and into a fuel coolant and bring the fuel coolant in direct contact with the nuclear fuel tiles. Nuclear fuel tiles can be shaped with discontinuous nuclear fuel lateral facets and have fuel cool-
(Continued)

ant passages formed therein to provide direct contact between the fuel coolant and the nuclear fuel tiles. In U-Mod, tube liners with hydrogen diffusivity retain hydrogen in the solid-phase moderator even at elevated temperatures and the thermal insulator insulates the solid-phase moderator from the nuclear fuel tiles.

38 Claims, 12 Drawing Sheets

(51) Int. Cl.
*G21C 7/12* (2006.01)
*G21D 5/02* (2006.01)
*B64D 27/22* (2006.01)
*G21C 3/62* (2006.01)
*G21C 9/02* (2006.01)
*G21C 11/06* (2006.01)
*G21C 13/02* (2006.01)
*G21C 15/08* (2006.01)

(52) U.S. Cl.
CPC .............. *B64D 27/22* (2013.01); *G21C 3/626* (2013.01); *G21C 9/02* (2013.01); *G21C 11/06* (2013.01); *G21C 13/02* (2013.01); *G21C 15/08* (2013.01)

(58) Field of Classification Search
CPC .......... G21C 1/20; G21C 3/041; G21C 3/322; G21C 3/626; G21C 15/04; G21C 15/08; G21D 5/02
USPC ........................................ 376/289, 291, 425
See application file for complete search history.

(56) References Cited

U.S. PATENT DOCUMENTS

| | | |
|---|---|---|
| 4,626,405 A | 12/1986 | Field et al. |
| 5,410,578 A | 4/1995 | Walton |
| 9,299,464 B2 | 3/2016 | Venneri et al. |
| 9,620,248 B2 | 4/2017 | Venneri |
| 10,032,528 B2 | 7/2018 | Venneri |
| 10,109,378 B2 | 10/2018 | Snead |
| 10,475,543 B2 | 11/2019 | Venneri |
| 10,573,416 B2 | 2/2020 | Venneri |
| 10,643,754 B2 | 5/2020 | Venneri |
| 12,249,435 B2 * | 3/2025 | Barringer ................. G21C 5/02 |
| 2017/0249999 A1 | 8/2017 | DeWitte et al. |
| 2017/0263345 A1 | 9/2017 | Venneri et al. |
| 2020/0027587 A1 | 1/2020 | Venneri |

OTHER PUBLICATIONS

Office Action (Notice of Reasons for Rejection) issued May 14, 2024, by the Japan Patent Office in corresponding Japanese Patent Application No. 2022-516343 and an English translation of the Office Action. (10 pages).

International Preliminary Report on Patentability for International Application No. PCT/US2020/054190, dated Apr. 5, 2022, 5 pages.

International Search Report and Written Opinion for International Application No. PCT/US2020/054190, dated Feb. 17, 2021, 6 pages.

McClure, P., "Design and Testing of Small Nuclear Reactors for Defense and Space Applications," Invited Talk to ANS Trinity Section, Los Alamos National Laboratory, Santa Fe, NM, Sep. 20, 2013, 52 pages.

National Aeronautics and Space Administration (NASA), "Prometheus Project Final Report," 982-R120461, Oct. 1, 2005, 227 pages.

Poston et al., "Reference Reactor Module Design for NASA's Lunar Fission Surface Power System," Proceedings of Nuclear and Emerging Technologies for Space 2009, Atlanta, GA, Jun. 14-19, 2009, 18 pages.

Office Action, Communication pursuant to Article 94(3) EPC, issued Mar. 17, 2025, by the European Patent Office in corresponding European Patent Application No. 20 871 765.2-1211. (5 pages).

Office Action, Notice of Preliminary Rejection, issued Jun. 19, 2025, by the Korean Intellectual Property Office in corresponding Korean Patent Application No. 10-2022-7014930. (12 pages).

* cited by examiner

U-Mod Physical Property Table — 800
Candidate High-Temperature Thermal Insulators 802A-B to Form Insulator Elements 102A-N and
Candidate Low-Temperature Solid-Phase Moderators 803A-F to Form Moderator Elements 103A-N as Compared to Graphite 810

| Candidate Material Moderator 803A-G or Insulator 802A-B Material | Slowing Down Power ξΣs | Tmelt (Tdecomp) °C | Density (g/cc) | Chemical Reactivity (O2, N2, H2O) | Crystal | Irrad. Perf. (~500°C, >20 dpa) | Therm. Cond. (@~650°C) W/m-K |
|---|---|---|---|---|---|---|---|
| Graphite | 0.077 | >(3000) | 1.8 | O2-Rx@>800C | Hexag. | Poor | ~20 |
| CVD SiC | 0.044 | (2860) | 3.2 | Very Low | Cubic | Excellent | ~80 |
| ZrH | 0.859 | >(850) | 5.66 | Mildly High | Cubic | unknown | ~17 |
| MgO | 0.060 | 2853 | 3.58 | Mildly High | Cubic | Excellent | ~50 |
| Be2C | 0.125 | (~2100) | 1.9 | N-Rx@>1100C O2-Rx@>800C | Cubic | unknown | ~22 |
| ZrBe13 | 0.129 | 1525 | 2.72 |  | Cubic | unknown | ~40 |
| TiBe12 | 0.138 | 1925 | 2.26 |  | Hexag. | unknown | ~30 |
| BeO | 0.124 | 2507 | 3.015 | Very Low | Hexag. | Very Bad, anisotropic | ~30 |
| Be | 0.16 | 1287 | 1.85 | O2-Rx@>800C | Hexag. | Bad | ~60 |

FIG. 8

Nuclear Reactor Core Performance and Properties Comparison Table 1101

| Nuclear Reactor Systems 1100A-F | Nuclear Reactor Mass (kg) 1105A-F | Power Level (kWe) 1106A-F | Power per Mass (We/kg) 1107A-F | Outlet Temp. (K) 1108A-F | U-235 Enrichment 1109A-F |
|---|---|---|---|---|---|
| Basic S-Block and U-Mod 730 | 1,500 | 150 | 100 | 1,150 | LEU |
| Adv. S-Block and U-Mod 740 | 3,000 | 1,000 | 333 | 1,150 | LEU |
| NASA Fission Surface System | 1,400 | 40 | 16 | 850 | HEU |
| JIMO Reactor | 1,600 | 200 | 125 | 1,150 | HEU |
| KiloPower Derived System | 3,000 | 200 | 67 | ~1,000 | LEU |
| Megapower | 22,000 | 2,000 | 91 | ~1,000 | LEU |

FIG. 11

NUCLEAR REACTOR CORE ARCHITECTURE WITH MODERATOR ELEMENTS INSIDE INSULATOR ELEMENTS

CROSS-REFERENCE TO RELATED APPLICATIONS

This application is a U.S. National Phase Patent Application of International Application No. PCT/US2020/054190, filed on Oct. 4, 2020, the entirety of which is incorporated by reference herein. International Application No. PCT/US2020/054190 claims priority to U.S. Provisional Patent Application No. 62/910,561, filed on Oct. 4, 2019, titled "Nuclear System for Power Production in Space," the entirety of which is incorporated by reference herein.

This application relates to International Application No. PCT/US2020/054188, filed on Oct. 4, 2020, titled "Integrated In-Vessel Neutron Shield," which published as International Publication No. WO 2021/067901 on Apr. 8, 2021, the entirety of which is incorporated by reference herein. This application also relates to International Application No. PCT/US2020/054189, filed on Oct. 4, 2020, titled "Automatic Shutdown Controller For Nuclear Reactor System With Control Drums," which published as International Publication No. WO 2021/067902 on Apr. 8, 2021, the entirety of which is incorporated by reference herein.

TECHNICAL FIELD

The present subject matter relates to examples of nuclear reactor systems and nuclear reactors for power production and propulsion, e.g., in remote regions, such as outer space. The present subject matter also encompasses a nuclear reactor core architecture that includes nuclear fuel tiles and a low-temperature solid-phase moderator.

BACKGROUND

Nuclear fission reactors include thermal or fast type reactors. Currently, almost all operating nuclear fission reactors are thermal. Nuclear fission reactors include nuclear fuel inside a nuclear reactor core and a moderator to slow down fast neutrons so that nuclear fission can continue. Typically, the nuclear fuel is formed in cylindrical shaped fuel compacts or pellets. The fuel compacts are loaded into fuel pins or rods, cladded, and stacked inside the numerous columns of fuel elements in the nuclear reactor core. Unfortunately, such a nuclear fuel geometry does not maximize heat transfer from the nuclear fuel into a coolant and is restrictive in terms of imposing limits in the geometry of the nuclear reactor core.

In current high-temperature reactor designs of nuclear fission reactors, the cooling path and/or heat removal mechanism is shared between the nuclear fuel and the moderator. This means that any solid neutron moderator must be able to withstand the same high-temperature environment as the nuclear fuel. This issue is avoided in current designs of nuclear reactors by typically using graphite (C) as the neutron moderator or eschewing the use of a neutron moderator altogether.

Graphite is a crystalline form of the element carbon with atoms arranged in a hexagonal structure that is naturally occurring. Graphite is the most stable form of carbon under standard conditions. Graphite has a low neutron absorption cross-section, but a comparatively large neutron scattering cross-section. The neutron scattering cross-section ($\sigma_s$) for graphite is 4.7 barns and the neutron absorption cross-section ($\sigma_s$) for graphite is 0.0035 barns.

Today, a number of gas-cooled systems (e.g., prismatic or pebble-bed) and salt-cooled systems assume very large graphite moderated nuclear reactor core loadings. While there has been continual refinement in methods to process graphite as a single moderating material, providing both higher purity and better—more isotropic forms of graphite—a hard moderator lifetime limit remains for graphite. Essentially, the physics of irradiation-induced anisotropic crystal swelling leads to gross dimensional change of the graphite moderator material, microcracking, and loss of integrity of the graphite moderator material. Typical high-temperature gas-cooled reactors (HTGR) of approximately 200 megawatt electrical (MWe) have an associated graphite loading of approximately 600 tons. Newly anticipated salt-cooled systems will have similarly large graphite waste streams.

Unfortunately, contaminated graphite poses serious waste issues for these nuclear reactor systems as evidenced by the approximately 250,000 tons of graphite waste disposed of to date. While the level of contamination is dependent on the nuclear reactor system, nuclear fuel, and nuclear fuel quality, carbon-14 ($^{14}C$) and $^3T$ contamination are unavoidable. This nuclear waste issue is compounded by the fact that the graphite moderator lifetime for high-power (high neutron influence) systems mandate in-service change-out of significant volumes of the nuclear reactor core. Accordingly, improvements to moderators for a nuclear reactor core are needed.

Traditionally, in the field of nuclear systems for space applications, e.g., nuclear thermal propulsion (NTP), the power system utilizes "weapons grade materials" or "weapons grade nuclear fuel." Such weapons grade nuclear fuel is highly-enriched uranium enriched in Uranium-235 above twenty percent or comparable fissile material compositions. This not only induces a proliferation risk, but also prevents privately owned entities from developing and/or operating the system.

Non-nuclear systems, such as solar, wind, fossil fuel, chemical, and geothermal power systems are an alternative option to nuclear, but require a continuous fuel supply line and complex cumbersome physical apparatuses for their operation, as well as periodic maintenance throughout their lifetime. Furthermore, such non-nuclear systems have a low power density, which results in large heavy power systems, which prevents their use in outer space because of the inherent difficult associated with launching heavy payloads and large objects into and beyond Earth orbit.

Nuclear systems have a higher power per unit mass than non-nuclear systems and successful implementation of nuclear systems can enable future exploration and settlement of outer space. However, current nuclear reactor core architectures with non-weapons grade nuclear fuel present roadblocks to commercial and self-sustained settlement of outer space. Accordingly, improvements to nuclear fuel for a nuclear reactor core are needed.

SUMMARY

The various examples disclosed herein relate to nuclear reactor core technologies for nuclear reactor systems both for space or terrestrial land applications. The nuclear reactor system 100 includes a nuclear reactor core 101 that implements several advantageous technologies: (1) nuclear fuel tiles 104A-N(S-Block); and (2) a high-temperature thermal insulator 102A-N and tube liners 106A-N with a low-temperature solid-phase moderator 103A-N (U-Mod). S-Block and U-Mod improve safety, accident tolerance, reliability, heat transfer, efficiency, and compactness of the nuclear reactor core 101.

In S-Block, nuclear fuel tiles 104A-N include a fuel shape designed with an interlocking geometry pattern to beneficially optimize heat transfer between nuclear fuel tiles 104A-N and into a nuclear fuel coolant 170B and bring the nuclear fuel coolant 170B in direct contact with the nuclear fuel tiles 104A-N. The nuclear fuel tiles 104A-N can be shaped with discontinuous nuclear fuel lateral facets 181A-N and have fuel coolant passages 141A-N formed therein to provide direct contact between the nuclear fuel coolant 170B and the nuclear fuel tiles 104A-N.

In U-Mod, individual tube liners 106A-N are claddings or coatings around the individual low-temperature solid-phase moderator elements 103A-N. The tube liners 106A-N are formed of materials with low hydrogen diffusivity that are able to retain hydrogen even at elevated temperatures. The moderator elements 103A-N are formed of a low-temperature solid-phase moderator that is thermally insulated from the nuclear fuel tiles 104A-N by the insulator elements 102A-N. Tube liners 106A-N are formed of a hydrogen barrier material with low hydrogen diffusivity for hydrogen retention within the moderator elements 103A-N even at elevated operating temperatures. A combination of moderator coolant passages 121A-N and insulator elements 102A-N enable the moderator elements 103A-N to be at an operating temperature significantly lower than the nuclear fuel tiles 104A-N. U-Mod beneficially provides a cooling path and/or heat removal mechanism for the moderator elements 103A-N that is distinctly separated and thermally insulated from the nuclear fuel tiles 104A-N and the cooling and/or heat removal path for the nuclear fuel tiles 104A-N.

Moreover, graphite moderated nuclear reactor systems are large and ill-suited for space applications. While graphite has a low neutron absorption, it requires a large quantity to slow down fast neutrons. The ability for a moderator to compactly and effectively slowdown is referred to as macroscopic slowing down power, and graphite has a low macroscopic slowing down power. U-Mod enables the use of moderator that can have a higher macroscopic slowing down power than graphite. Moderators with a higher slowing down power (e.g., ZrH, Be, BeO, etc.) enable a more compact nuclear reactor core 101.

An example nuclear reactor system 100 that implements S-Block and U-Mod includes a nuclear reactor core 101 that includes an insulator element array 112 of insulator elements 102A-N and a moderator element array 113 of moderator elements 103A-N. A respective moderator element 103A-N is formed of a low-temperature solid-phase moderator disposed inside a respective insulator element 102A-N. The nuclear reactor core 101 further includes a nuclear fuel tile array 114 of nuclear fuel tiles 104A-N. A respective nuclear fuel tile 104A-N includes a plurality of nuclear fuel lateral facets 181A-N that border the respective insulator element 102A-N or another respective nuclear fuel tile 104A-N. The respective moderator element 103A-N is insulated from the nuclear fuel tile array 114 of nuclear fuel tiles 104A-N by the respective insulator element 102A-N.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations in accordance with the present concepts, by way of example only, not by way of limitations. In the figures, like reference numerals refer to the same or similar elements.

FIG. 8 is a U-Mod physical property table of two candidate high-temperature thermal insulators to form insulator elements and six candidate low-temperature solid-phase moderators to form moderator elements as compared to graphite.

FIG. 11 is a nuclear reactor core performance and properties comparison table comparing nuclear reactor mass, power level, power per mass, outlet temperature, and uranium 235 (U-235) enrichment of six different nuclear reactor systems.

PARTS LISTING

Figure 1:
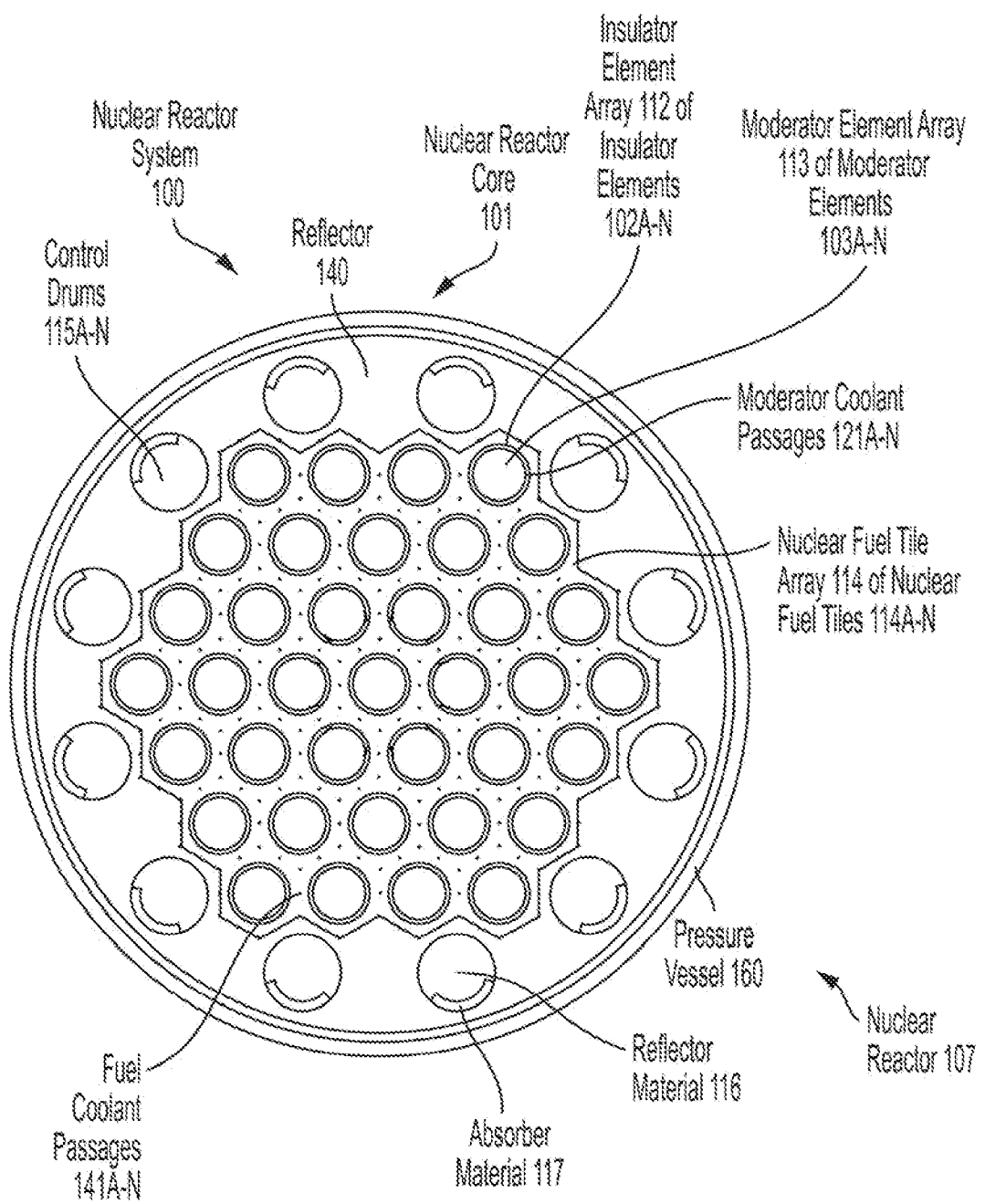
FIG. 1 is a cross-sectional view of a nuclear reactor core of a nuclear reactor system.

100 Nuclear Reactor System
101 Nuclear Reactor Core
102A-N Insulator Elements
103A-N Moderator Elements
104A-N Nuclear Fuel Tiles
106A-N Tube Liners
107 Nuclear Reactor
112 Insulator Element Array
113 Moderator Element Array
114 Nuclear Fuel Tile Array
115A-N Control Drums
116 Reflector Material
117 Absorber Material
121A-N Moderator Coolant Passages
140 Reflector
141A-N Fuel Coolant Passages
150 Fuel Compact 151A-N TRISO Fuel Particles
152 High-Temperature Matrix
160 Pressure Vessel
170 Coolant
170A Moderator Coolant
170B Nuclear Fuel Coolant
181A-N Nuclear Fuel Lateral Facets
182A-N Tile Interface Walls
183A-N Insulator Element Interface Walls
186 Outer Periphery
191A-N Nuclear Fuel Lateral Facets
195A-N Moderator Openings
196A-N Insulator Element Lateral Facets
198A-N Insulator Element Border Walls
700 Reactor Outlet Temperature Graph
705 Nominal Power Level
710 Maximum Reactor Outlet Temperature
720 Baseline Nuclear Reactor Core
730 Basic S-Block and U-Mod
740 Advanced S-Block and U-Mod
800 U-Mod Physical Property Table
802A-B Candidate High-Temperature Thermal Insulators
803A-F Candidate Low-Temperature Solid-Phase Moderators
810 Graphite
900 Thermal Analysis Graph
903 Moderator Element Maximum Temperature
904 Nuclear Fuel Tile Maximum Temperature
905 Axial Distance
910 Temperature
970A Moderator Coolant Maximum Temperature
970B Nuclear Fuel Coolant Maximum Temperature
1000 Depletion Graph of Nuclear Reactor Core
1005 Lifetime
1010 K-Effective
1100A-F Nuclear Reactor Systems
1101 Nuclear Reactor Core Performance and Properties Comparison Table
1105A-F Nuclear Reactor Mass
1106A-F Power Level
1107A-F Power per Mass
1108A-F Outlet Temperature
1109A-F Uranium-235 Enrichment

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The term "coupled" as used herein refers to any logical or physical connection. Unless described otherwise, coupled elements or devices are not necessarily directly connected to one another and may be separated by intermediate components, elements, etc.

Unless otherwise stated, any and all measurements, values, ratings, positions, magnitudes, sizes, angles, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±5% or as much as ±10% from the stated amount. The term "approximately" or "substantially" means that the parameter value or the like varies up to ±10% from the stated amount.

The orientations of the nuclear reactor core 101, nuclear reactor 107, associated components, and/or any nuclear reactor system 100 incorporating the nuclear reactor core 101, such as shown in any of the drawings, are given by way of example only, for illustration and discussion purposes. In operation for a particular nuclear reactor system 100, the nuclear reactor 107 may be oriented in any other direction suitable to the particular application of the nuclear reactor 107, for example upright, sideways, or any other orientation. Also, to the extent used herein, any directional term, such as lateral, longitudinal, up, down, upper, lower, top, bottom, and side, are used by way of example only, and are not limiting as to direction or orientation of any nuclear reactor 107 or component of the nuclear reactor 107 constructed as otherwise described herein. Reference now is made in detail to the examples illustrated in the accompanying drawings and discussed below.

FIG. 1 is a cross-sectional view of a nuclear reactor core 101 of a nuclear reactor system 100. The nuclear reactor system 100 includes an architecture for the nuclear reactor core 101 that includes several enhancing technologies: (1) nuclear fuel tiles 104A-N (referred to as "S-Block"); and (2) a high-temperature thermal insulator with a low-temperature solid-phase moderator (referred to as "U-Mod").

In S-Block technology, nuclear fuel tiles 104A-N include a fuel shape designed to optimize heat transfer into a nuclear fuel coolant 170B by bringing the nuclear fuel coolant 170B in direct contact with the nuclear fuel tiles 104A-N. Nuclear fuel tiles 104A-N can be shaped as unit-lattice element that is relatively simple to manufacture due to the shape and size of the tile geometry. In U-Mod technology, a high-temperature moderator is surrounded by a tube liner 106A-N applied as a hydrogen barrier cladding or coating around moderator elements 103A-N. Tube liners 106A-N can be formed of solid phase hydrides and are able to retain hydrogen even at elevated temperatures of nuclear fuel tiles 104A-N. Insulator elements 102A-N are formed of a high-temperature thermal insulator material. A combination of moderator coolant passages 121A-N and the insulator elements 102A-N enable the moderator elements 103A-N to be at a temperature significantly lower than the nuclear fuel tiles 104A-N.

Nuclear reactor system 100 can be a high-temperature, gas-cooled, thermal spectrum reactor that implements a high-temperature nuclear fuel in a custom geometric shape of nuclear fuel tiles 104A-N(S-Blocks) to maximize heat transfer into the nuclear fuel coolant 170B. Nuclear reactor system 100 also implements a high-temperature and high-performance neutron moderator formed by a combination of the insulator elements 102A-N, moderator elements 103A-N, tube liners 106A-N, and moderator coolant passages 121A-N (U-Mod).

Nuclear reactor system 100 includes a nuclear reactor 107. The nuclear reactor 107 includes the nuclear reactor core 101, in which a controlled nuclear chain reactions occurs, and energy is released. The neutron chain reaction in the nuclear reactor core 101 is critical—a single neutron from each fission nucleus results in fission of another nucleus—the chain reaction must be controlled.

By sustaining controlled nuclear fission, the nuclear reactor system 100 produces heat energy. In an example implementation, the nuclear reactor system 100 is implemented as a gas-cooled nuclear reactor 107 where moderator coolant 170A and nuclear fuel coolant 170B are a gas to achieve performance gains. In the gas-cooled nuclear reactor 107, the high power density, rated power output, and safety case of the nuclear reactor core 101 enabled by S-Block and U-Mod drastically reduces the costs of nuclear energy and enables modular, offsite construction. However, the S-Block and U-Mod technologies can also enable breakthrough performance in other thermal spectrum nuclear reactor systems 100, including large utility scale reactors, heat pipe reactors, and molten-salt-cooled reactors.

In the depicted example, the nuclear reactor system 100 with the nuclear reactor core 101 is utilized in a space environment, such as in a nuclear thermal propulsion (NTP) system. An example NTP system that the S-Block and U-Mod architecture of the nuclear reactor core 101 can be implemented in is described in FIGS. 1-2 and the associated text of U.S. Pat. No. 10,643,754 to Ultra Safe Nuclear Corporation of Seattle, Washington, issued May 5, 2020, titled "Passive Reactivity Control of Nuclear Thermal Propulsion Reactors" the entirety of which is incorporated by reference herein. In another example, the nuclear reactor system 100 with the nuclear reactor core 101 is utilized in a space reactor for electrical power production on a planetary surface.

Conventional space reactor designs typically utilize highly-enriched uranium (HEU) fuel (weapons grade) to have both low-mass and high-temperature output. The architecture for the nuclear reactor core 101 described herein is directly applicable to enabling the development of low-mass, high-temperature, low-enriched uranium (LEU) fueled (non-weapons grade) nuclear reactors to increase efficiency and can be designed specifically for space applications. For example, the nuclear reactor system 100 that includes the nuclear reactor core 101 can be a nuclear thermal rocket reactor, nuclear electric propulsion reactor, Martian surface reactor, or lunar surface reactor.

In such an NTP system (e.g., compact space nuclear reactor), a generated thrust propels a vehicle that houses, is formed integrally with, connects, or attaches to the nuclear reactor core 101, such as a rocket, drone, unmanned air vehicle (UAV), aircraft, spacecraft, missile, etc. Typically, this is done by heating a propellant, typically low molecular weight hydrogen, to over 2,600° Kelvin by harnessing thermal energy from the nuclear reactor core 101. In addition, the NTP nuclear reactor system 100 can be used in the propulsion of submarines or ships.

As noted above, the nuclear reactor system 100 can also be a nuclear power plant in a terrestrial land application, e.g., for providing nuclear power (e.g., thermal and/or electrical power) for remote region applications, including outer space, celestial bodies, planetary bodies, and remotes regions on Earth. An example terrestrial land nuclear reactor system that the S-Block and U-Mod architecture of the nuclear reactor core 101 can be implemented in is described in FIG. 1 and the associated text of U.S. Patent Pub. No. 2020/0027587 to Ultra Safe Nuclear Corporation of Seattle, Washington, published Jan. 23, 2020, titled "Composite Moderator for Nuclear Reactor Systems," the entirety of which is incorporated by reference herein.

Nuclear reactor system 100 can also be a terrestrial power system, such as a nuclear electric propulsion (NEP) system for fission surface power (FSP) system. NEP powers electric thrusters such as a Hall-effect thruster for robotic and human spacecraft. FSP provides power for planetary bodies such as the moon and Mars. In the NEP and FSP power applications, the nuclear reactor system 100 enabled with S-Block and U-Mod technologies heats a working fluid (e.g., He, HeXe, Ne, $CO_2$) through a power conversion system (e.g., Brayton) to produce electricity. Moreover, in the NEP and FSP power applications, the nuclear reactor system 100 does not include a propellant, but rather includes a working fluid that passes through a reactor inlet when producing power. In the NEP and FSP power applications, the moderator elements 103A-N can be cooled via the reactor inlet working fluid (e.g., the flow coming out of a recuperator) before the working fluid passes through the nuclear fuel tiles 104A-N.

Utilizing the two S-Block and U-Mod nuclear reactor technologies described herein enables a nuclear reactor system 100 that is high-temperature, compact, accident tolerant, and operates safely and reliably throughout the lifetime of the nuclear reactor system 100. For example, the nuclear reactor system 100 can be a small commercial fission power system for near term space operations, lunar landers, or a commercial fission power system for high-power spacecraft and large-scale surface operations, such as in-situ resource utilization.

As shown, nuclear reactor core 101 includes an insulator element array 112 and a moderator element array 113, which implements U-Mod technology. U-Mod technology enables building of a compact nuclear reactor system 100 with a large enough power density, rated power output, and lifetime that is commercially viable. As shown, insulator element array 112 includes thirty-seven insulator elements 102A-N and moderator element array 113 includes thirty-seven moderator elements 103A-N. A respective moderator element 103A-N is formed of a low-temperature solid-phase moderator disposed inside (e.g., located within) a respective insulator element 102A-N. Although A is the first letter of the alphabet and N is the fourteenth letter of the alphabet, due to the restriction of the alphabet, the designation "A-N" when following a reference number, such as 102, 103, 104, 121, 141, etc. can refer to more than twenty-six of those identical elements.

U-Mod technology is an improvement over current methods for cooling solid-phase moderators in the nuclear reactor core 101 utilizing a closed-loop power cycle. U-Mod provides a cooling path and/or heat removal mechanism for the moderator elements 103A-N that is distinctly separated and thermally insulated from the nuclear fuel tiles 104A-N and the cooling and/or heat removal path for the nuclear fuel tiles 104A-N. Thermal insulation of the moderator elements 103A-N is achieved by two separate insulating mechanisms: (1) a high-temperature thermal insulator (e.g., insulator elements 102A-N); and (2) a separate moderator cooling loop for the moderator coolant 170A (e.g., gaseous or liquid) that includes moderator coolant passages 121A-N. The high-temperature thermal insulator forming the insulator elements 102A-N is a solid thermal insulator that is the interface between the nuclear fuel tiles 104A-N and the moderator element array 113 assembly of moderator elements 103A-N. The high-temperature thermal insulator is made of a low thermal conductivity material capable of operating at elevated temperatures of the nuclear fuel tiles 104A-N.

U-Mod technology enables maintaining the moderator elements 103A-N at a distinctly separate and lower operating temperature from the nuclear fuel tiles 104A-N. U-Mod technology thus allows the low-temperature solid-phase neutron moderator material forming the moderator elements 103A-N to be maintained at a lower temperature within high-temperature thermal nuclear reactor system 100 utilizing a closed-loop power cycle. In U-Mod, each of the insulator elements 102A-N is formed of the high-temperature thermal insulator material with low thermal conductivity. Insulator elements 102A-N are formed in conjunction with the moderator coolant passages 121A-N and tube liners 106A-N that enable low hydrogen diffusivity.

The high-temperature thermal insulator material can include low density carbides, metal-carbides, metal-oxides, or a combination thereof. More specifically, the high-temperature thermal insulator material includes low density SiC, stabilized zirconium oxide, aluminum oxide, low density ZrC, low density carbon, or a combination thereof. Tube liners 106A-N are formed of a hydrogen barrier material with low hydrogen diffusivity. The hydrogen barrier material includes $Al_yO_x$, SiC, ZrC, MgO, Mo, W, Cu, Ni, Cr, or a combination thereof for retention of hydrogen in the moderator elements 103A-N. Moderator elements 103A-N are formed of a low-temperature solid-phase moderator. The low-temperature solid-phase moderator includes $MgH_x$, $YH_x$, $ZrH_x$, $CaH_x$, $ZrO_x$, $CaO_x$, $BeO_x$, $BeC_x$, Be, enriched boron carbide, $^{11}B_4C$, $CeH_x$, $LiH_x$, or a combination thereof. In one implementation, the moderator elements 103A-N are formed of the low-temperature solid-phase moderator that includes ZrH with the tube liners 106A-N (see FIG. 3) coated thereon. Moderator elements 103A-N are coupled to a two-pass in-core coolant pathway to enable compact size of the nuclear reactor core 101 and LEU nuclear fuel to be implemented in the nuclear fuel tiles 104A-N. A respective moderator element 103A-N is disposed inside a respective tube liner 106A-N for hydrogen retention.

To further enhance the temperature of the low-temperature solid-phase moderator forming the moderator elements 103A-N and prevent the loss of nuclear fuel coolant 170B (e.g., propellant, such as hydrogen) during operation and accident conditions, the tube liners 106A-N are implemented as the hydrogen barrier material. The hydrogen barrier material of the tube liners 106A-N keeps the hydrogen in the low-temperature solid-phase moderator material. The hydrogen in the low-temperature solid-phase moderator material is what slows down neutrons in the nuclear reactor core 101. The hydrogen barrier material is needed because hydrogen is always trying to escape from the low-temperature solid-phase moderator material and hydrogen diffuses through the low-temperature solid-phase moderator material.

In a first implementation, the tube liners 106A-N are a hydrogen barrier material coatings applied to, e.g., coated around or on, the surfaces of the low-temperature solid-phase moderator material with the low-temperature solid-phase moderator material forming the moderator elements 103A-N disposed inside the hydrogen barrier material coating. In a second implementation, the tube liners 106A-N can be implemented as a hydrogen barrier material cladding, such as a hermetically sealed container, with the low-temperature solid-phase moderator material forming the moderator elements 103A-N disposed inside the hydrogen barrier material cladding.

Nuclear reactor core 101 further includes a nuclear fuel tile array 114, which implements S-Block technology to enhance modular construction of the nuclear reactor core 101 and reduce the need for site specific environmental design of the nuclear reactor system 100. Moreover, the safety properties of the S-Block fuel reduce risk and can reduce human personnel requirements to monitor the nuclear reactor system 100. S-Block technology is achieved by the nuclear fuel tile array 114 that includes a plurality of nuclear fuel tiles 104A-N. Nuclear fuel tiles 104A-N are formed into a fuel shape to increase heat transfer into the nuclear fuel tiles 104A-N and effectively reduce safety margins, provide higher power nuclear reactor systems, and consequently improve the economics of the nuclear reactor core 101.

Figure 3:
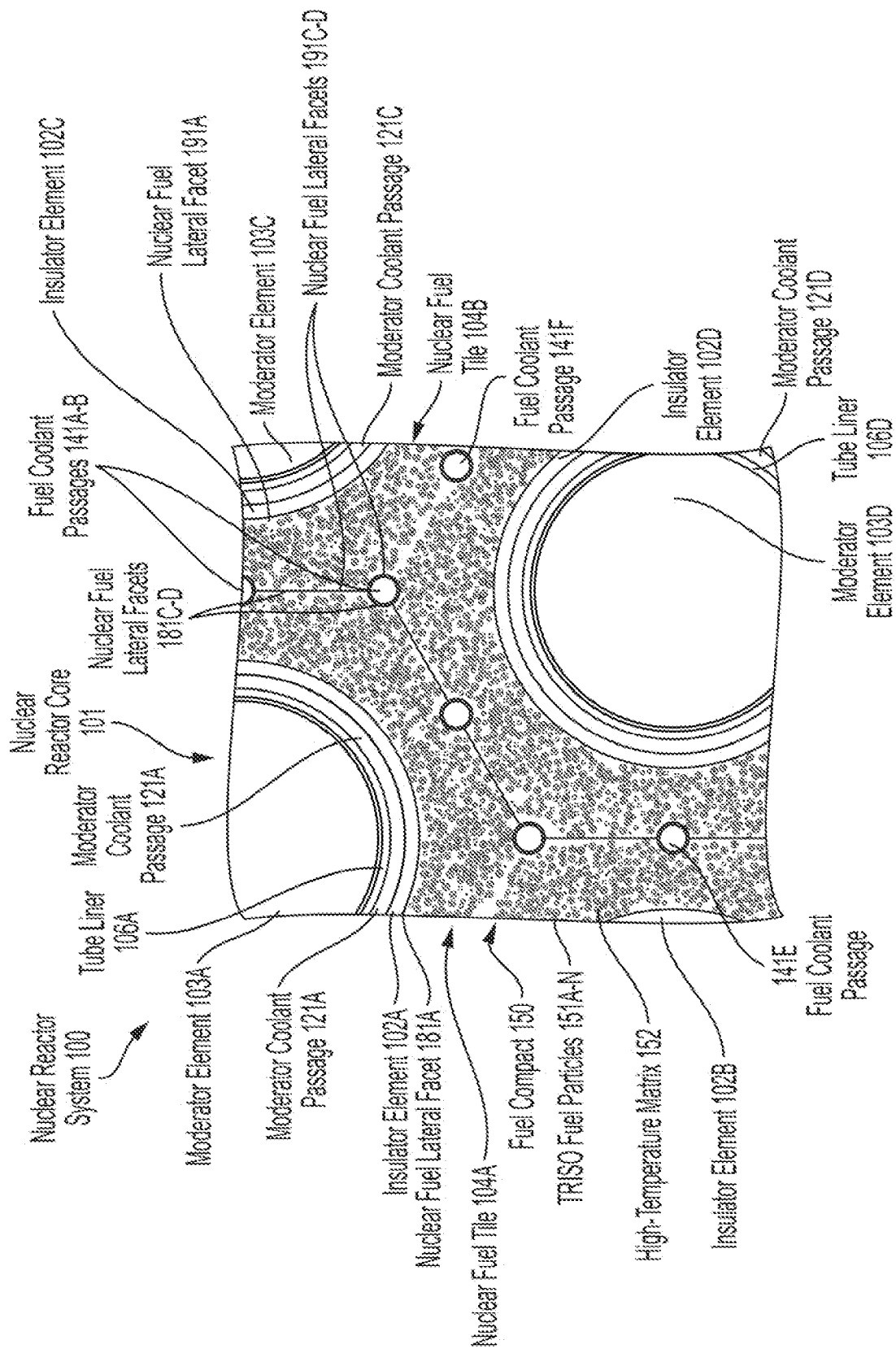
FIG. 3 is a zoomed-in view of the cross-section of the nuclear reactor core of FIG. 1 depicting details of insulator elements, tube liners, moderator elements, and nuclear fuel tiles.

Nuclear fuel tiles 104A-N create a heat conduction pathway between the nuclear fuel tiles 104A-N, and have a modular geometry to improve manufacturing costs. As shown in the example of FIG. 3, the nuclear fuel tiles 104A-N can be formed of a base nuclear fuel that includes tri-structural isotropic fuel (TRISO) fuel particles 151A-N. TRISO fuel particles 151A-N include a fuel kernel coated by the following layers: (1) low density graphite; (2) pyrolytic graphite (PyG); (3) silicon carbide (SiC); (4) PyG; and (5) SiC. The TRISO fuel particles 151A-N are suspended in a high-temperature matrix 152 to form the base nuclear fuel. The high-temperature matrix 152 (see FIG. 3) can include SiC, a refractory metal carbide, tungsten, molybdenum, or a combination thereof. The refractory metal carbide forming the high-temperature matrix can include zirconium carbide (ZrC), titanium carbide (TiC), niobium carbide (NbC), etc.

Nuclear fuel tiles 104A-N enable a high-performance nuclear fuel that exceeds existing nuclear fuel limits—use of refractory carbide compacts to enable operation of the nuclear reactor core 101 in excess of 3,000 degrees Kelvin (K). High performance refractory carbides are chemically compatible with the hot hydrogen environment and relevant fuel particle coatings (PyC) in space applications (e.g., NTP), such as the NERVA/Rover program and provide some of the lowest vaporization rates at high temperature to enhance overall engine lifetime and enable the potential for nuclear reactor core reusability. Modern manufacturing techniques, such as reactive Spark Plasma Sintering (SPS) and advanced oxide additives, can allow for the refractory carbides to be utilized to form the nuclear fuel tiles 104A-N. Many refractory carbides have a low neutron absorption cross section and a high moderating power. This allows for criticality to be achieved with LEU as the fuel kernel.

Nuclear fuel tiles 104A-N are implemented with a base shape (e.g., illustrated in FIG. 4A-B, 5, 6) or a truncated portion thereof, which advantageously enables the direct contact between nuclear fuel tiles 104A-N to increase the heat transfer between the nuclear fuel tiles 104A-N. The base shape of the nuclear fuel tiles 104A-N also increases the heat transfer into the nuclear fuel coolant 170B. Nuclear fuel tiles 104A-N provide a reproducible unit cell that is easily tiled to fit multiple nuclear reactor core 101 geometry requirements, including complex core geometries, and enable high density neutron moderators to be utilized as the moderator elements 103A-N in the active nuclear reactor core 101. In contrast to conventional cylindrical shaped nuclear fuel pellets, the nuclear fuel tiles 104A-N reduce the temperature difference between the nuclear fuel tiles 104A-N and the nuclear fuel coolant 170B, provide a conduction pathway from the nuclear fuel tiles 104A-N to the structure of the nuclear reactor system 100 outside the nuclear reactor core 101 in case of a loss of coolant accident, and improve heat transfer into the nuclear fuel coolant 170B.

The fuel shape of nuclear fuel tiles 104A-N can be manufactured using spark plasma sintering (SPS) or other sintering techniques as it has a L/D less than one (plate like). This allows the relatively simple manufacture of the elements to reduce the vertical press distance for the final stage of densification. Additive manufacturing can be used instead.

In an NTP, NEP, or FSP nuclear reactor system 100, the nuclear reactor 107 can include a plurality of control drums 115A-N and a reflector 140. The control drums 115A-N may laterally surround the insulator element array 112 of insulator elements 102A-N, the moderator element array 113 of moderator elements 103A-N, and nuclear fuel tile array 114 of nuclear fuel tiles 104A-N to change reactivity of the nuclear reactor core 101 by rotating the control drums 115A-N. As depicted, the control drums 115A-N reside on the perimeter or periphery of a pressure vessel 160 and are positioned circumferentially around the insulator elements 102A-N, tube liners 106A-N, moderator elements 103A-N, and nuclear fuel tiles 104A-N of the nuclear reactor core 101. Control drums 115A-N may be located in an area of the reflector 140, e.g., an outer reflector region immediately surrounding the nuclear reactor core 101, to selectively regulate the neutron population and nuclear reactor power level during operation. For example, the control drums 115A-N can be a cylindrical shape and formed of both a reflector material 116 (e.g., beryllium (Be), beryllium oxide (BeO), BeSiC, BeMgO, $Al_2O_3$, etc.) on a first outer surface and an absorber material 117 on a second outer surface.

The reflector material 116 and the absorber material 117 can be on opposing sides of the cylindrical shape, e.g., portions of an outer circumference, of the control drums 115A-N. The reflector material 116 can include a reflector substrate shaped as a cylinder or a truncated portion thereof. The absorber material 117 can include an absorber plate or an absorber coating. The absorber plate or the absorber coating are disposed on the reflector substrate to form the cylindrical shape of each of the control drums 115A-N. For example, the absorber plate or the absorber coating covers the reflector substrate formed of the reflector material to form the control drums 115A-N.

Rotating the depicted cylindrical-shaped control drums 115A-N changes proximity of the absorber material 117 (e.g., boron carbide, $B_4C$) of the control drums 115A-N to the nuclear reactor core 101 to alter the amount of neutron reflection. When the reflector material 116 is inwards facing towards the nuclear reactor core 101 and the absorber material 117 is outwards facing, neutrons are scattered back (reflected) into the nuclear reactor core 101 to cause more fissions and increase reactivity of the nuclear reactor core 101. When the absorber material 117 is inwards facing towards the nuclear reactor core 101 and the reflector material 116 is outwards facing, neutrons are absorbed and further fissions are stopped to decrease reactivity of the nuclear reactor core 101. In a terrestrial land application, the nuclear reactor core 101 may include control rods (not shown) composed of chemical elements such as boron, silver, indium, and cadmium that are capable of absorbing many neutrons without themselves fissioning.

Neutron reflector 140, e.g., shown as the outer reflector region, can be filler elements disposed between outermost nuclear fuel tiles 104A-N and the control drums 115A-N as well as around the control drums 115A-N. Reflector 140 can be formed of a moderator that is disposed between the outermost nuclear fuel tiles 104A-N and an optional barrel (e.g., formed of beryllium). The reflector 140 can include hexagonal or partially hexagonal shaped filler elements and can be formed of a neutron moderator (e.g., beryllium oxide, BeO). Although not required, nuclear reactor 107 can include the optional barrel (not shown) to surround the bundled collection that includes the insulator element array 112, tube liners 106A-N, moderator element array 113, nuclear fuel tile array 114 of the nuclear reactor core 101, as well as the reflector 140. As depicted, the control drums 115A-N reside on the perimeter of the pressure vessel 160 and can be interspersed or disposed within the reflector 140, e.g., surround a subset of the filler elements (e.g., reflector blocks 141A-N) forming the reflector 140.

Pressure vessel 160 can be formed of aluminum alloy, carbon-composite, titanium alloy, a radiation resilient SiC composite, nickel based alloys (e.g., Inconel™ or Haynes™), or a combination thereof. Pressure vessel 160 and nuclear reactor system 100 can be comprised of other components, including cylinders, piping, and storage tanks that transfer a moderator coolant 170A that flows through moderator coolant passages 121A-N; and a separate nuclear fuel coolant 170B, such as a propellant (e.g., hydrogen gas or liquid) that flows through the fuel coolant passages 141A-N. The moderator coolant 170A and the nuclear fuel coolant 170B can be a gas or a liquid, e.g., that transitions from a liquid to a gas state during a burn cycle of the nuclear reactor core 101 for thrust generation in an NTP nuclear reactor system 100. Hydrogen is for an NTP nuclear reactor system 100. In NEP or FSP applications, the nuclear reactor system 100 circulates a working fluid, such as He, neon, HeXe, $CO_2$, instead.

Nuclear reactor system 100 advantageously enables the moderator coolant 170A to flow through the moderator coolant passages 121A-N and a separate nuclear fuel coolant 170B (e.g., a propellant, such as hydrogen gas) to flow through the fuel coolant passages 141A-N. The moderator coolant passages 121A-N are flattened ring shaped (e.g., O-shape) openings, such as a channels or holes to allow the moderator coolant 170A to pass through in the nuclear reactor core 101 and into a heat sink (not shown) via a dedicated moderator coolant loop, for example. The fuel coolant passages 141A-N are channels or holes to allow the nuclear fuel coolant 170B to pass through in the nuclear reactor core 101 and into a thrust chamber (not shown) for propulsion in a separate nuclear fuel coolant loop, for example.

In an alternative implementation, a coolant 170 that is shared between the moderator elements 103A-N and the nuclear fuel tiles 104A-N may be flowed through both the moderator coolant passages 121A-N and the fuel coolant passages 141A-N, but the alternative implementation may not achieve the enhanced performance gains described herein. In the alternative implementation, the coolant 170 that flows through the nuclear fuel tiles 104A-N can include helium, FLiBe molten salt formed of lithium fluoride (LiF), beryllium fluoride ($BeF_2$), sodium, He, HeXe, $CO_2$, neon, or HeN. In the alternative implementation, the shared coolant 170 flows through the moderator coolant passages 121A-N before the shared coolant 170 is heated in the nuclear fuel tiles 104A-N. This keeps the moderator elements 103A-N cool.

Figure 2:
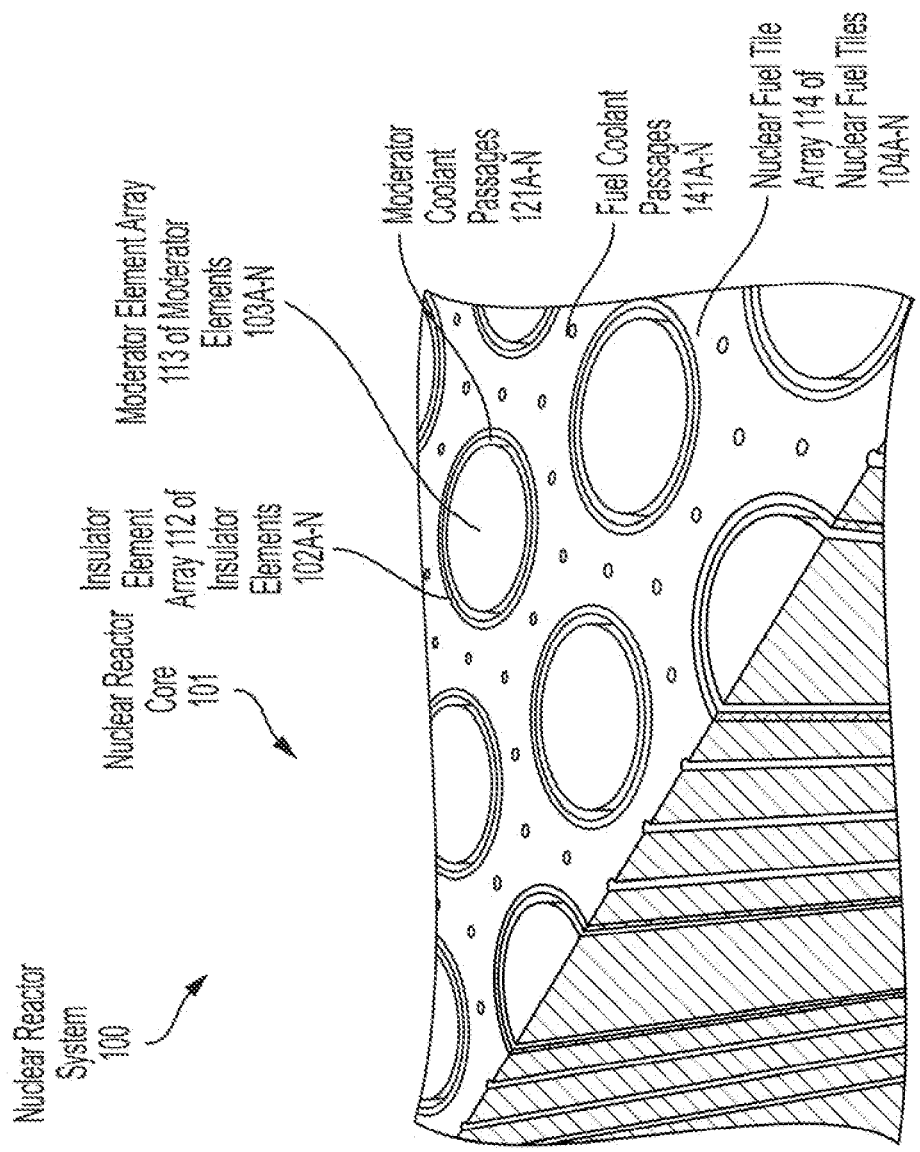
FIG. 2 is an isometric view of a portion of the nuclear reactor core of FIG. 1 showing details of moderator coolant passages and fuel coolant passages.

FIG. 2 is an isometric view of a portion of the nuclear reactor core 101 of FIG. 1 showing details of moderator coolant passages 121A-N and fuel coolant passages 141A-N. As depicted, the respective insulator element 102A-N is shaped as a tube or a pipe. The respective insulator element 102A-N with the respective moderator element 103A-N disposed inside includes a respective moderator coolant passage 121A-N formed therein. The respective moderator coolant passage 121A-N is located between the respective moderator element 103A-N and the respective insulator element 102A-N.

In some examples (e.g., see FIGS. 4A-B and 5), the insulator elements 102A-N are depicted as a cylindrical shaped tube or pipe, the moderator elements 103A-N are depicted as cylinders, the moderator coolant passages 121A-N are depicted as ring shaped, and the fuel coolant passages 141A-N are depicted as cylinders. However, the insulator elements 102A-N, the moderator elements 103A-N, the moderator coolant passages 121A-N, and fuel coolant passages 141A-N can be formed into a variety of shapes. In addition to being a circular or other round shape in two-dimensional space, the insulator elements 102A-N, the moderator coolant passages 121A-N, and fuel coolant passages 141A-N can be oval, square, rectangular, triangular, or another polygon shape. For example, the insulator elements 102A-N can be a polyhedron (e.g., a triangular prism as shown in FIG. 6 or a cuboid) in three-dimensional space. In order to be disposed inside the insulator elements 102A-N, the moderator elements 103A-N can be a shape that conforms to the shape of the insulator elements 102A-N and the moderator coolant passages 121A-N.

The architecture of the nuclear reactor core 101 improves cooling of a solid-phase moderator, shown as moderator elements 103A-N, in nuclear power reactors. A closed-loop coolant cycle achieves a separate and insulated mechanism for cooling the moderator elements 103A-N via moderator coolant passages 121A-N that does not interfere with the cooling system of the nuclear fuel, shown as nuclear fuel tiles 104A-N.

By insulating and separately cooling the moderator elements 103A-N formed of the low-temperature solid-phase moderator separately, the low-temperature solid-phase moderator can be kept at a lower temperature compared to the nuclear fuel (e.g., nuclear fuel tiles 104A-N). This enables the implementation of the low-temperature solid-phase moderator (such as hydride-based and beryllium-based), which is attractive due to the higher neutron moderating ability of the low-temperature solid-phase moderator relative to a high-temperature solid-phase moderator (e.g., carbon-based graphite).

If allowed to reach higher temperatures, the low-temperature solid-phase moderator forming the moderator elements 103A-N may begin to dissociate or decompose, resulting in a net loss of reactivity, slowing the fission or chain reaction. By encasing or coating the moderator elements 103A-N within tube liners 106A-N (see FIG. 3), insulating the moderator elements 103A-N from the nuclear fuel tiles 104A-N with insulator elements 102A-N, and then creating the moderator coolant passages 121A-N in a separate moderator cooling loop from the fuel coolant passages 141A-N of the nuclear fuel tiles 104A-N, a high-temperature nuclear reactor 107 optimized for small size is achieved.

Use of the low-temperature solid-phase moderator for the moderator elements 103A-N is important for high-temperature nuclear reactors optimized for small size that use low-enriched uranium (LEU) as nuclear fuel. Because the low-temperature solid-phase moderator that forms the moderator elements 103A-N has a higher moderating power and slowing down ratio (macroscopic slowing down power), the low-temperature solid-phase moderator enables a compact nuclear reactor system 100 with smaller amounts of fissile material (e.g., reduces the amount of uranium needed in the nuclear reactor core 101). The depicted nuclear reactor core 101 thus provides a wider range of operating temperatures, loop configurations, and applications.

Accordingly, in the depicted example of FIG. 2, the respective moderator coolant passage 121A-N flows a moderator coolant 170A through to both: (i) heat the moderator coolant 170A, and (ii) cool the respective moderator element 103A-N. The respective nuclear fuel tile 104A-N includes one or more nuclear fuel coolant passages 141A-N formed therein that flow a nuclear fuel coolant 170B that is separate from and different from the moderator coolant 170A in order to heat the nuclear fuel coolant 170B via direct contact with the respective nuclear fuel tile 104A-N. Nuclear fuel coolant 170B can be a propellant (e.g., hydrogen) for nuclear thermal propulsion (NTP). In other words, the moderator coolant 170A that flows through the respective moderator coolant passage 121A-N is in a moderator coolant loop dedicated to the moderator element array 113 of moderator elements 103A-N and that is thermally isolated and separated from a nuclear fuel coolant loop that includes the fuel coolant passages 141A-N to flow the nuclear fuel coolant 170B. In an NEP or FSP nuclear reactor 107, a working fluid, such as He, neon, HeXe, $CO_2$, etc. is circulated instead.

Moderator coolant loop thermally isolates the moderator coolant 170A from the nuclear fuel coolant 170B to actively remove heat from the moderator elements 103A-N to maintain the moderator elements 103A-N at a lower temperature compared to the nuclear fuel tile array 114 of fuel tiles 104A-N during operation of the nuclear reactor core 101. Moderator coolant loop includes a heat sink, which can be mounted on an exterior of the pressure vessel 160 or on other components of the nuclear reactor system 100 and the moderator coolant 170A is thermally coupled to the heat sink.

Although not shown, the nuclear reactor system 100 can further include a moderator coolant turbopump assembly comprising at least one turbine and a pump that moves the moderator coolant 170A to flow through the heat sink to cool the plurality of moderator elements 103A-N during operation of the nuclear reactor core 101. The pump and turbine in the moderator coolant turbopump assembly flow the moderator coolant 170A through the moderator coolant piping, moderator coolant passages 121A-N, and then the heat sink, where the moderator coolant 170A becomes cooled after passing through the heat sink. Nuclear reactor system 100 can also include a compressor and a blower that moves the moderator coolant 170A. If the moderator coolant 170A is in a gas state as opposed to a liquid state, then the compressor and the blower move the moderator coolant 170A through the moderator coolant piping, moderator coolant passages 121A-N, and then the heat sink. When the moderator coolant 170A is in a liquid state, the pump flows the moderator coolant 170A. In an NTP nuclear reactor system 100, the moderator elements 103A-N and nuclear fuel tiles 104A-N can draw from the same turbopump assembly.

Nuclear reactor system 100 further includes a nuclear fuel coolant turbopump assembly that flows the nuclear fuel coolant 170B to flow through the nuclear fuel tiles 104A-N to generate power during operation of the nuclear reactor core 101. The pump and turbine in the nuclear fuel coolant turbopump assembly move the nuclear fuel coolant 170B (e.g., propellant) through nuclear fuel coolant piping and then the fuel coolant passages 141A-N. By passing through the fuel coolant passages 141A-N, the nuclear fuel coolant 170B becomes superheated in the nuclear fuel tiles 104A-N of the nuclear reactor core 101 and expands to a gas, e.g., for thrust or power generation. In NEP or FSP applications, the nuclear reactor system 100 includes a turbojet (e.g., a turbine and a compressor), instead of a turbopump assembly for the coolant 170A-B.

As noted above, the separated moderator coolant loop and nuclear fuel coolant loop serve to further isolate the moderator elements 103A-N from the nuclear fuel tiles 104A-N, as well as actively removes heat from the moderator elements 103A-N due to internal heating. In addition to enabling low-temperature solid-phase moderator materials to be maintained at a lower temperature, the heated moderator coolant 170A itself, can also be used for the following advantageous purposes. First, moderator coolant 170A can be chemically incompatible with the plurality of nuclear fuel tiles 104A-N to drive a secondary power cycle and/or supply additional neutron moderation in the nuclear reactor system 100. In NEP or FSP applications, the point of the nuclear reactor system 100 is to generate power. Second, moderator coolant 170A allows for preheating of the nuclear fuel coolant 170B, either indirectly or directly, enabling a higher reactor outlet temperature. Third, moderator coolant 170A allows for cooling of other parts of the nuclear reactor system 100 without affecting the dynamic fluid system performance of the nuclear fuel tiles 104A-N cooling path and/or heat removal mechanism. Fourth, moderator coolant 170A allows for a hydrogen overpressure to be maintained when the moderator elements 103A-N are formed of a hydrogenous low-temperature solid-phase moderator. Fifth, moderator coolant 170A allows for the application of an inherent safety mechanism, where decomposition of the neutron moderator occurs due to higher temperatures reached in an accident scenario. Decomposition of the neutron moderator would inhibit any re-criticality from occurring.

In an application where achieving a high-temperature and compact nuclear reactor system 100 is not important, the moderator coolant passages 121A-N can be in the same cooling loop with the fuel coolant passages 121A-N. Accordingly, in such an application the respective moderator coolant passage 121A-N flows a coolant 170 through to both: (i) heat the coolant 170, and (ii) cool the respective moderator element 103A-N.

FIG. 3 is a zoomed-in view of the cross-section of the nuclear reactor core 101 of FIG. 1 depicting details of insulator elements 102A-D, tube liners 106A-D, moderator elements 103A-C, and nuclear fuel tiles 104A-B. Two nuclear fuel files 104A-B are shown in the cross-section of FIG. 3. Each of the nuclear fuel tiles 104A-N is formed of a fuel compact 150 comprised of: coated fuel particles, such as tristructural-isotropic (TRISO) fuel particles 151A-N embedded inside a high-temperature matrix 152. In some implementations, the fuel compact 150 is comprised of bistructural-isotropic (BISO) fuel particles embedded inside the high-temperature matrix 152. The high-temperature matrix 152 includes silicon carbide, zirconium carbide, titanium carbide, niobium carbide, tungsten, molybdenum, or a combination thereof. Each of the TRISO fuel particles 151A-N can include a fuel kernel surrounded by a porous carbon buffer layer, an inner pyrolytic carbon layer, a ceramic layer, and an outer pyrolytic carbon layer.

A description of TRISO fuel particles dispersed in a silicon carbide matrix to form a cylindrical shaped nuclear fuel compact is provided in the following patents and publications of Ultra Safe Nuclear Corporation of Seattle, Washington: U.S. Pat. No. 9,299,464, issued Mar. 29, 2016, titled "Fully Ceramic Nuclear fuel and Related Methods"; U.S. Pat. No. 10,032,528, issued Jul. 24, 2018, titled "Fully Ceramic Micro-encapsulated (FCM) fuel for CANDUs and Other Reactors"; U.S. Pat. No. 10,109,378, issued Oct. 23, 2018, titled "Method for Fabrication of Fully Ceramic Microencapsulation Nuclear Fuel"; U.S. Pat. No. 9,620,248, issued Apr. 11, 2017 and U.S. Pat. No. 10,475,543, issued Nov. 12, 2019, titled "Dispersion Ceramic Micro-encapsulated (DCM) Nuclear Fuel and Related Methods"; U.S. Patent Pub. No. 2020/0027587, published Jan. 23, 2020, titled "Composite Moderator for Nuclear Reactor Systems"; and U.S. Pat. No. 10,573,416, issued Feb. 25, 2020, titled "Nuclear Fuel Particle Having a Pressure Vessel Comprising Layers of Pyrolytic Graphite and Silicon Carbide," the entireties of which are incorporated by reference herein. As described in those Ultra Safe Nuclear Corporation patents, the nuclear fuel generally includes a cylindrical fuel compact or pellet comprised of TRISO fuel particles embedded inside a silicon carbide matrix to create the cylindrical shaped nuclear fuel compact.

Of the possible high-temperature matrix 152 materials to embed the coated fuel particles, including TRISO fuel particles 151A-N or BISO fuel particles, which form the nuclear fuel tiles 104A-N, silicon carbide (SiC) offers good irradiation behavior, and fabrication. SiC has excellent oxidation resistance due to rapid formation of a dense, adherent silicon dioxide ($SiO_2$) surface scale on exposure to air at elevated temperature, which prevents further oxidation. TRISO fuel particles 151A-N can include a fuel kernel (e.g., UC or uranium oxycarbide (UCO) in the center), coated with one or more layers surrounding one or more isotropic materials. TRISO fuel particles 151A-N include four layers of three isotropic materials. For example, the four layers can include: (1) a porous buffer layer made of carbon; followed by (2) a dense inner layer of pyrolytic carbon (PyC); followed by (3) a binary carbide layer (e.g., ceramic layer of SiC or a refractory metal carbide layer) to retain fission products at elevated temperatures and to give the TRISO fuel particles 151A-N a strong structural integrity; followed by (4) a dense outer layer of PyC. The refractory metal carbide layer of the TRISO fuel particles 151A-N can include at least one of titanium carbide (TiC), zirconium carbide (ZrC), niobium carbide (NbC), tantalum carbide, hafnium carbide, ZrC—$ZrB_2$ composite, ZrC—$ZrB_2$—SiC composite, or a combination thereof. The high-temperature matrix 152 can be formed of the same material as the binary carbide layer of the TRISO fuel particles 151A-N.

TRISO fuel particles 151A-N are designed not to crack due to the stresses or fission gas pressure at temperatures beyond 1,600° C., and therefore can contain the fuel kernel in the worst of accident scenarios. TRISO fuel particles 151A-N are designed for use in high-temperature gas-cooled reactors (HTGR) that include the nuclear reactor core 101 and to be operating at temperatures much higher than the temperatures of LWRs. Nuclear fuel tiles 104A-N have exceptional fission product retention. TRISO fuel particles 151A-N have extremely low failure below 1500° C. Moreover, the presence of the high-temperature matrix 152 provides an additional robust barrier to fission product release.

A respective nuclear fuel tile 104A-N includes a plurality of nuclear fuel lateral facets 181A-N (see FIGS. 4A-B, 5, and 6) that border a respective insulator element 102A-N or another respective nuclear fuel tile 104A-N. Nuclear fuel lateral facets 181A-N appear to an observer as a curved surface or a flat surface like a cut gemstone with many facets. A "facet" can be a flattened segment (e.g., planar surface) or curved segment (e.g., aspherical or spherical surface). The multiple nuclear fuel lateral facets 181A-N form a discontinuous (e.g., non-uniform or jagged) outer periphery 186 of the nuclear fuel tile 104A. As used herein "interface wall" includes a section of the outer periphery 186 that the outer periphery 186 is divided into. The interface wall can be formed of one facet (single faceted) like the insulator element interface wall 183A of FIG. 4B or multiple facets (multi-faceted) like the tile interface wall 182A of FIG. 4B.

Nuclear reactor core 101 includes tube liners 106A-N within an insulated boundary for the moderator coolant 170A to interface between the insulator elements 102A-N and the moderator elements 103A-N in a flow path of the moderator cooling loop. A respective tube liner 106A-N is formed as a cladding with lower hydrogen permeability that sheaths the respective moderator element 103A-N from the nuclear fuel tile array 114 of nuclear fuel tiles 104A-N. Hence, the moderator element 103A is advantageously surrounded by the tube liner 106A, the moderator coolant passage 121A, the insulator element 102A, and then finally the nuclear fuel tile 104A.

The respective moderator element 103A-N is insulated from the nuclear fuel tile array 114 of nuclear fuel tiles 104A-N by the respective insulator element 102A-N. Looking at the first nuclear fuel tile 104A, a first moderator element 103A is disposed inside a first tube liner 106A; and a first insulator element 102A is disposed inside the first nuclear fuel tile 104A. A first moderator coolant passage 121A is disposed between the first tube liner 106A and the first insulator element 102A. A second moderator element 103B, second tube liner 106B, and second moderator coolant passage 121B (not visible in the zoomed-in view) are disposed in a similar relationship. A first nuclear fuel tile 104B includes a first plurality of nuclear fuel lateral facets 181A-N. Nuclear fuel lateral facet 181A borders the first insulator element 102A; and nuclear fuel lateral facet 181C borders the second nuclear fuel tile 104B. In FIG. 3, the nuclear fuel lateral facet 181A includes a spherical surface and the nuclear fuel lateral facet 181C includes a planar surface.

Looking at the third nuclear fuel tile 104C, a third moderator element 103C is disposed inside a third tube liner 106C; and a third insulator element 102C is disposed inside the second nuclear fuel tile 104B. A third moderator coolant passage 121C is disposed between the third tube liner 106C and the third insulator element 102C. A fourth moderator element 103D, fourth tube liner 106D, and fourth moderator coolant passage 121D (not visible in the zoomed-in view) are disposed in a similar relationship. The second nuclear fuel tile 104B includes a second plurality of nuclear fuel lateral facets 191A-N. Nuclear fuel lateral facet 191A borders the third insulator element 102C; and nuclear fuel lateral facet 191C borders the first nuclear fuel tile 104A. In the example, the nuclear fuel lateral facet 191A includes a spherical surface and the nuclear fuel lateral facet 191C includes a planar surface.

As further shown, the first plurality of nuclear fuel lateral facets 181A-N and the second plurality of nuclear fuel lateral facets 191A-N border each other to collectively form five fuel coolant passages 141A-E. In the example, nuclear fuel lateral facet 181D of the first nuclear fuel tile 104A and nuclear fuel lateral facet 191D of the second nuclear fuel tile 104B each include a spherical surface to form respective portions (e.g., half rings) of a second fuel coolant passage 141B.

Nuclear reactor core 101 that implements U-Mod includes the respective moderator element 103A-N disposed inside the respective tube liner 106A-N for hydrogen retention. The respective tube liner 106A-N is between the respective moderator element 103A-N and the respective moderator coolant passage 121A-N. The respective moderator coolant passage 121A-N is between the respective tube liner 106A-N and the respective insulating element 102A-N. The respective insulating element 102A-N is between the respective moderator coolant passage 121A-N and the respective nuclear fuel tile 104A-N.

Tube liners 106A-N can include supports for the high-temperature thermal insulator (insulator elements 102A-N) and the low-temperature solid-phase neutron moderator (moderator elements 103A-N). Tube liners 106A-N provide hydrogen retention within the moderator elements 103A-N, and a combination of moderator coolant passages 121A-N and insulator elements 102A-N enable the moderator elements 103A-N to be at a temperature significantly lower than the nuclear fuel tiles 104A-N. The tube liner 106A is located between moderator element 103A and the moderator coolant passage 121A. The moderator coolant passage is located between the tube liner 106A and the nuclear fuel tile 104A.

Tube liner 106A is formed of a hydrogen barrier material and the insulator element 102A is formed of a low thermal conductivity material. Tube liners 106A-N can be a continuous weave nuclear grade SiC/SiC composite closed-end tube to clad the moderator elements 103A-N. The end-joint design can be a combined mechanical and liquid phase sintered (LPS) joint that achieves good irradiation and mechanical performance.

To implement the U-Mod system, the nuclear reactor system 100 can also include a lower temperature heat sink. For a closed-loop power cycle, the most direct method is the cold end of the power cycle. Another option is an unheated reactor inlet, where the moderator coolant 170A comes from cool parts of the power cycle such as a reactor inlet, compressor outlet, or the cold end of the power cycle. In addition, an external heat sink, external cold sink, or a separate power cycle altogether can also be employed.

Figure 4A:
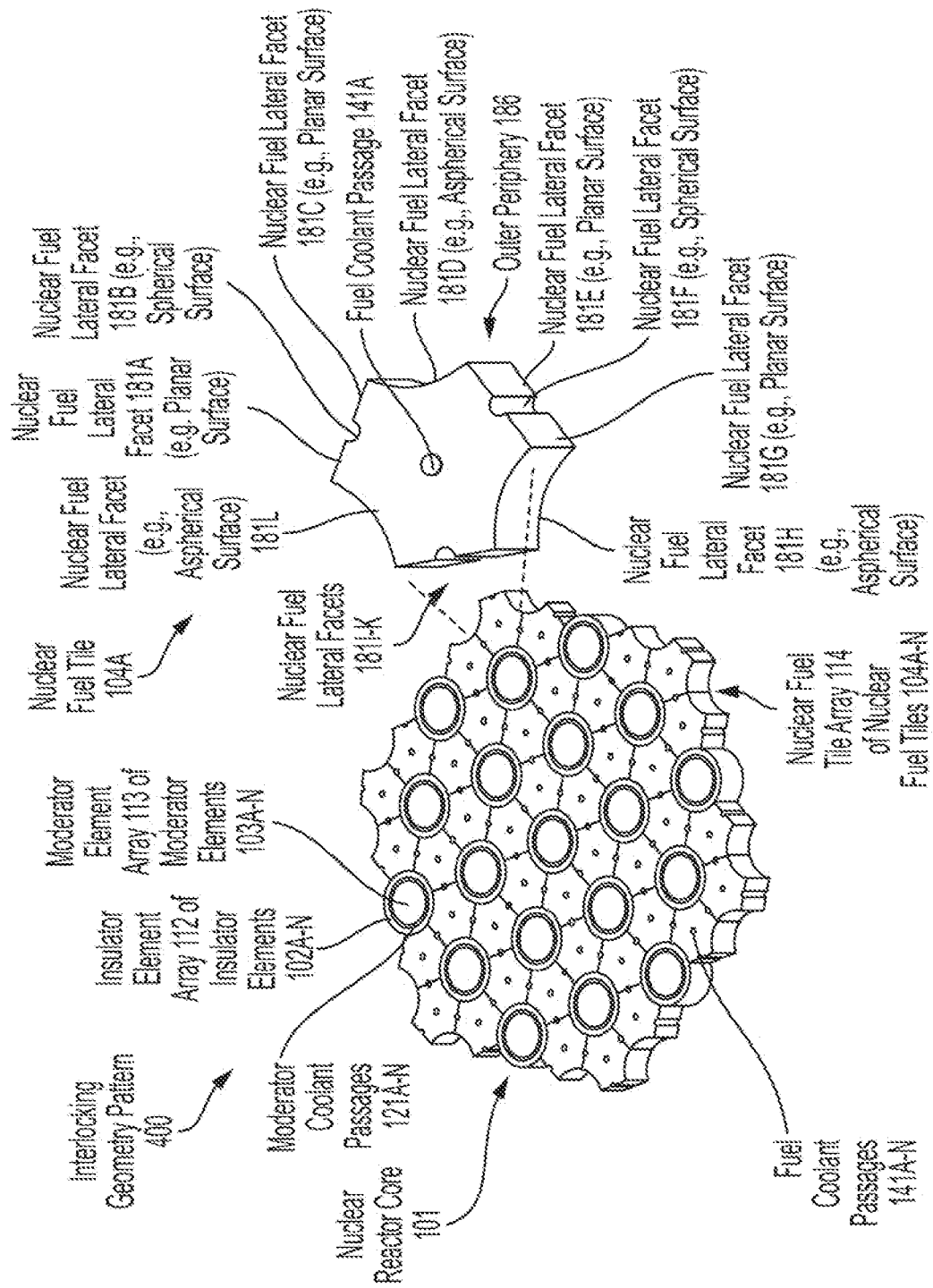
FIGS. 4A-B illustrate a first interlocking geometry pattern of the insulator element array of insulator elements, moderator element array of moderator elements, and nuclear fuel tile array of nuclear fuel tiles.
Figure 4B:
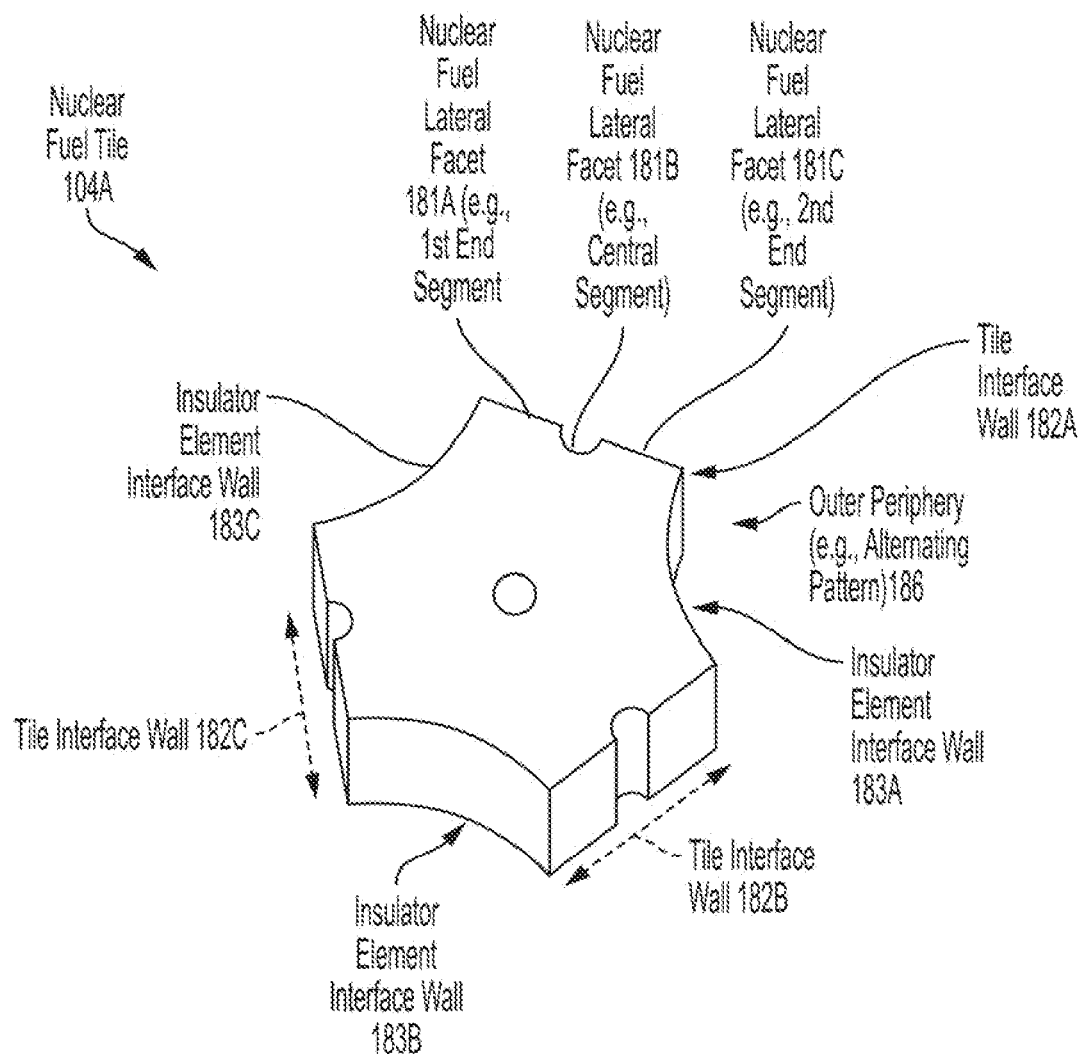

FIGS. 4A-B illustrate a first interlocking geometry pattern 400 of the insulator element array 112 of insulator elements 102A-N, moderator element array 113 of moderator elements 103A-N, and nuclear fuel tile array 114 of nuclear fuel tiles 104A-N. In the first interlocking geometry pattern 400 of FIGS. 4A-B, nineteen insulator elements 102A-N, nineteen moderator elements 103A-N, forty-two nuclear fuel tiles 104A-N, nineteen moderator coolant passages 121A-N, and seventy-eight completed fuel coolant passages 141A-N are shown.

Nuclear fuel tiles 104A-N have an optimized geometry with a continuous interlocking pattern to minimize gaps between nuclear fuel tiles 104A-N and maximize nuclear reactor core 101 heat transfer during accident scenarios. The optimized geometry maximizes heat transfer from the nuclear fuel into the nuclear fuel coolant 170B and into the surrounding structures, enables heat conduction between the nuclear fuel tiles 104A-N, integrates with in-core high performance moderators, and implements TRISO fuel particles 151A-N embedded in a high-temperature matrix 152. TRISO fuel particles 151A-N suspended in the high-temperature matrix 152 of the nuclear fuel tiles 104A-N provide high gas outlet temperatures for power generation and/or process heat while limiting temperatures in the moderator elements 103A-N.

As shown, the nuclear fuel tile 104A includes a plurality of nuclear fuel lateral facets 181A-L that are discontinuous to form an outer periphery 186 of the respective nuclear fuel tile 104A-N. As used herein, "discontinuous" means that the outer periphery 186 formed by the nuclear fuel lateral facets 181A-N in aggregate do not form a continuous round (e.g., circular or oval) perimeter. The outer periphery 186 includes a plurality of planar, aspherical, spherical, or freeform surfaces. As used herein, a "freeform surface" does not have rigid radial dimensions, unlike regular surfaces, such as a planar surface; or an aspherical or spherical surface (e.g., cylinder, conical, quadric surfaces).

Nuclear fuel lateral facets 181A-C, 181E-G, 181I-K form tile interface walls 182A-C, respectively. Nuclear fuel lateral facets 181D, 181H, and 181L form insulator element interface walls 183A-C, respectively. A respective tile interface wall 182A-C alternates with a respective insulator element interface wall 183A-C to form an alternating pattern of the outer periphery 186. The respective tile interface wall 182A-C includes a planar surface.

As shown in FIG. 4B, the tile interface wall 182A includes two nuclear fuel lateral facets 181A, 181C on opposing ends with a nuclear fuel lateral facet 181B extending between. In the example of tile interface wall 182A, the two nuclear fuel lateral facets 181A, 181C (e.g., first and second end segments) are on opposing ends and each include a planar surface. The nuclear fuel lateral facet 181B (e.g. central segment) extending between includes an aspherical or spherical surface. Tile interface walls 182AB-C are formed with a respective geometry like that of tile interface wall 182A. The respective tile interface wall 182A-C borders the other respective nuclear fuel tile 104A-N. The respective insulator element interface wall 183A-C borders the respective insulator element 102A-N. The respective insulator element interface wall 183A-C includes an aspherical or spherical surface.

As noted above, graphite-moderated nuclear reactors are generally very large. Making a graphite-moderator nuclear reactor smaller requires nuclear reactor core refueling, as the core contains little fissile material. Frequent refueling is incompatible with a compact nuclear reactor, which has no onsite refueling. U-Mod is implemented by encasing the moderator elements 103A-N (e.g., ZrH or Be-based low-temperature solid-phase moderator) with insulator elements 102A-N (e.g., radiation-tolerant high-temperature material) to increase the structural strength of the low-temperature solid-phase moderator and thermally insulate to maintain acceptably low-temperatures. This enables the nuclear fuel tiles 104A-N(S-block) as a larger volume of the nuclear reactor core 101 rather than the moderator elements 103A-N, which enables longer lifetimes from the compact nuclear reactor core 101. The smaller nuclear reactor core 101 size enabled by U-Mod allows a more compact form factor than graphite-moderated systems and can also reduce construction costs and increase transportability while operating at high power densities.

Another benefit of U-Mod is the enablement of a small nuclear reactor system 100 that can utilize low-assay low-enriched uranium (LEU) fuel (generally <10% $^{235}$U) in the TRISO fuel particles 151A-N. Many new advanced reactor systems require high-assay low-enriched uranium fuel (generally >10% $^{235}$U), which is not currently produced and has more proliferation-related concerns.

Figure 5:
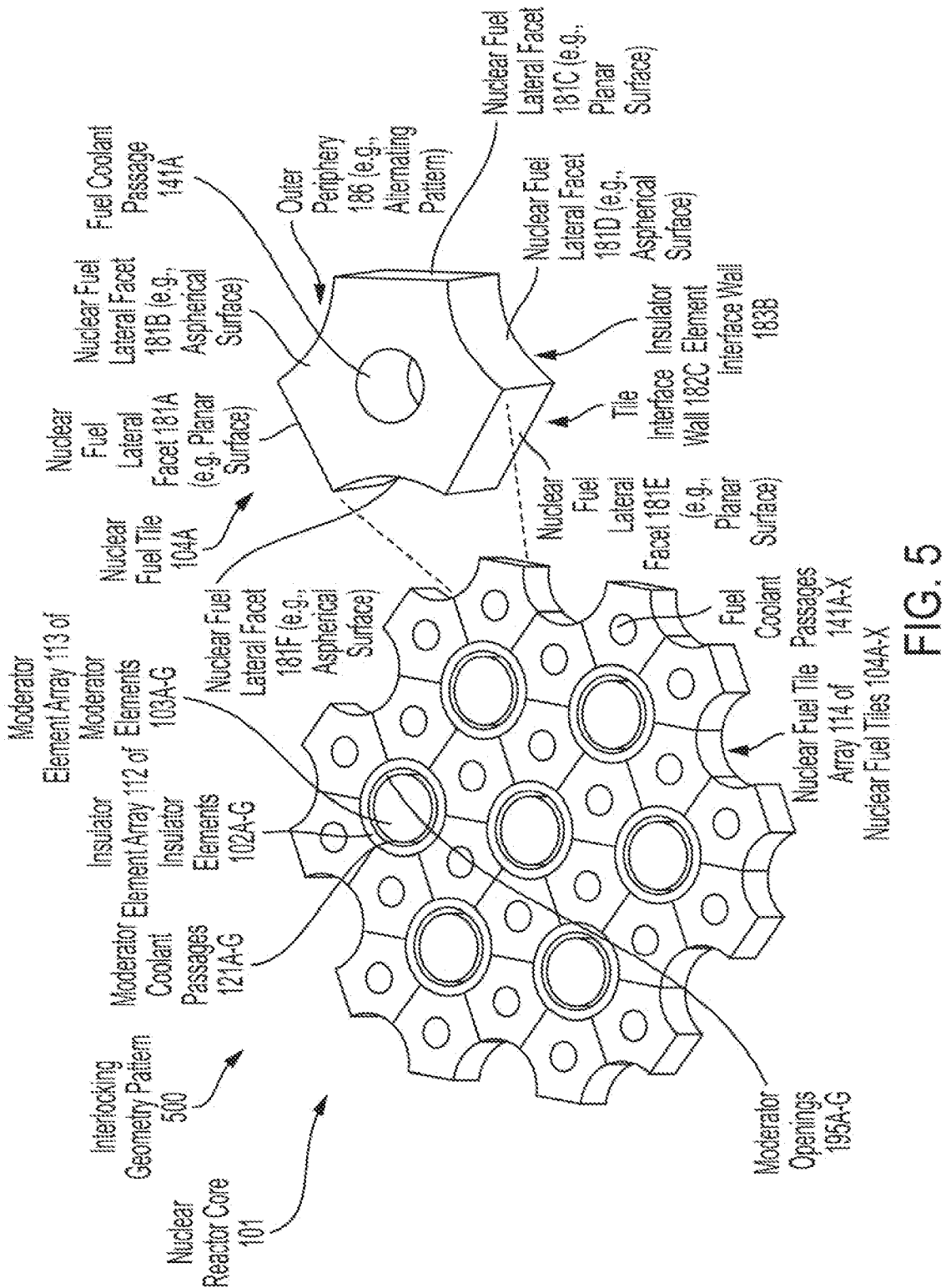
FIG. 5 illustrates a second interlocking geometry pattern of the insulator element array, moderator element array, and nuclear fuel tile array.
Figure 6:
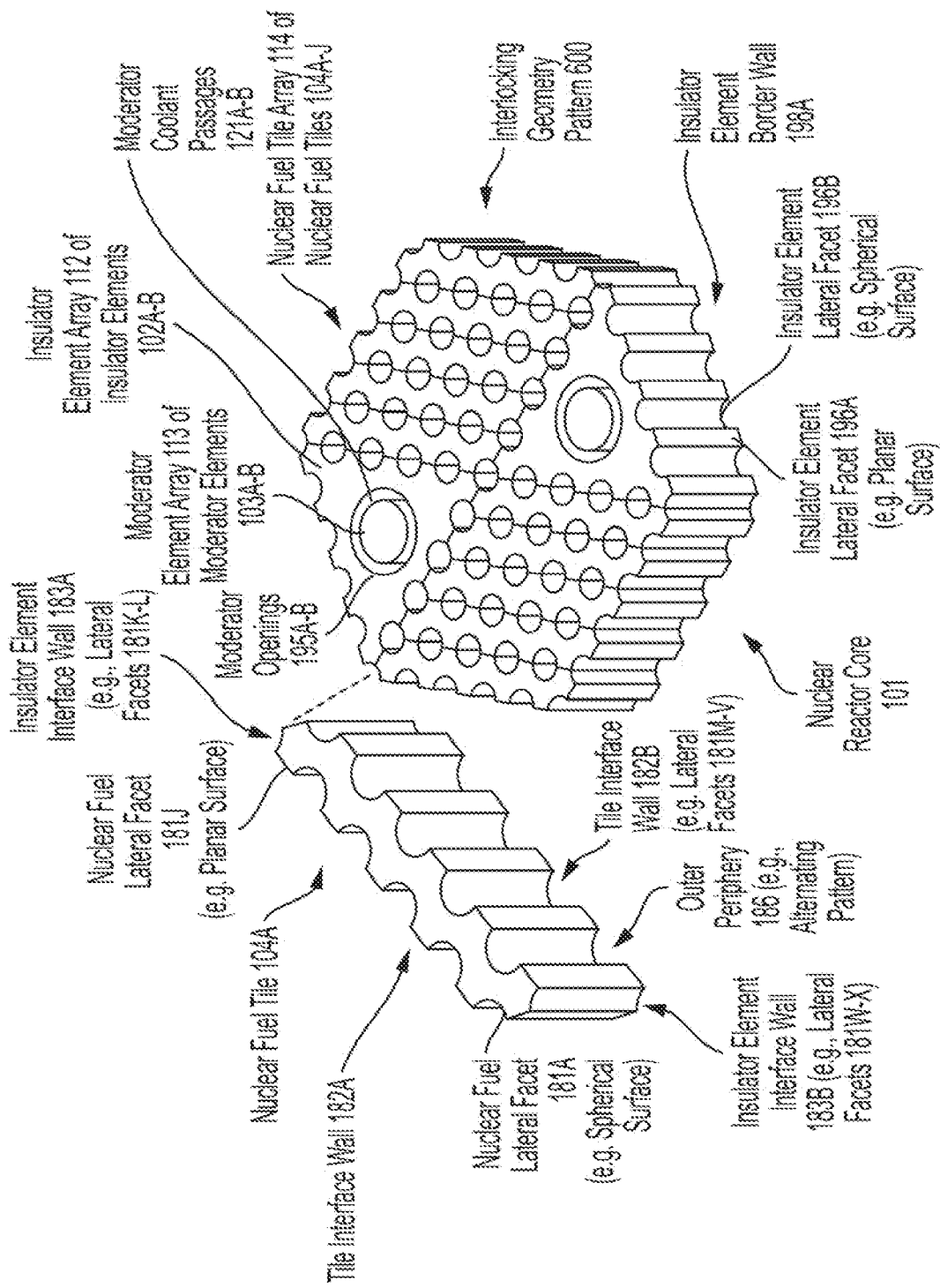
FIG. 6 illustrates a third interlocking geometry pattern of the insulator element array, moderator element array, and nuclear fuel tile array.

FIG. 5 illustrates a second interlocking geometry pattern 500 of the insulator element array 112 of insulator elements 102A-N, moderator element array 113 of moderator elements 103A-N, and nuclear fuel tile array 114 of nuclear fuel tiles 104A-N. In FIG. 5, the nuclear fuel lateral facets 181A-F of the respective nuclear fuel tile 104A-N alternate between bordering the respective insulator element 102A-N and the other respective nuclear fuel tile 104A-N.

In the second interlocking geometry pattern 500 of FIG. 5, seven insulator elements 102A-G, seven moderator elements 103A-G, twenty-four nuclear fuel tiles 104A-X, seven moderator coolant passages 121A-G, and twenty-four fuel coolant passages 141A-X are shown. The respective insulator element 102A-G is shaped as a tube or a pipe. The respective insulator element 102A-N can include silicon carbide. The respective insulator element 102A-G lines the respective insulating interface 183A-C wall of two or more nuclear fuel tiles 104A-N. Insulator elements 102A-G can be nuclear grade SiC or SiC composite closed-end tube to clad the moderator elements 103A-G.

As shown, the respective insulator element 102A-G is shaped as cylinder that includes a respective moderator opening 195A-G (e.g. space or hole) of a plurality of moderator openings 195A-G formed longitudinally therein. The respective moderator element 103A-G is disposed inside the respective moderator opening 195A-G. The respective moderator element 103A-N can include beryllium, such as, for example, beryllium carbide or beryllium oxide.

In a first U-Mod example, the moderator elements 103A-G are formed of a high volume fraction chopped-fiber beryllium carbide (Be$_2$C) composite infiltrated with beryllium. Sintering of Be$_2$C—Be composite can takes advantage of the exothermic reaction between Be and C and uses small amounts of Si to enhance wetting. By sintering, the moderator elements 103A-G are formed as a Be-metal matrix that can be comprised of Be in a Be$_2$C web. The Be-metal matrix includes a matrix volume fraction set (from between approximately zero to approximately 50%). In a second U-Mod example, the solid-phase moderator of the moderator elements 103A-G includes ZrH, which can be shaped as a cylindrical pellet clad in structurally strong insulator elements 102A-G. The moderator elements 103A-G are cooled in separate cooling path from the nuclear fuel tiles 104A-X by moderator coolant passages 121A-G.

Nuclear fuel tiles 104A-N formed of TRISO fuel particles 151A-N embedded in the high-temperature matrix 152 can be formed through direct current sintering (DCS). Nuclear fuel tiles 104A-N achieve high levels of fuel burnup (>>100 GWd/tonne), operate at extreme temperatures (e.g., approximately 1,200° C.), and have excellent behavior under irradiation. Nuclear fuel tiles 104A-N can include greater than 50% volume packing fraction of TRISO fuel particles 151A-N within the high-temperature matrix 152. TRISO fuel particles 151A-N dispersed in the high-temperature matrix 152 can include a fuel kernel coated by alternating or sequential layers of a low density carbon, a binary carbide layer, and a pyrolytic graphite. Binary carbide layer can include silicon carbide (SiC) or a refractory metal carbide, such as titanium carbide (TiC), zirconium carbide (ZrC), niobium carbide (NbC), or a combination thereof. When the binary carbide layer is formed of the refractory metal carbide, several advantages can be provided. First the refractory metal carbide that forms the binary carbide layer allows the TRISO fuel particles 151A-N to provide multiple barriers of protection that retain the fissile fuel kernel for ultra-high temperature operation (>3000 degrees Kelvin). The refractory metal carbide also attenuates fission products to reduce irradiation damage of the high-temperature matrix 152. The refractory carbide layer thus behaves as a pressure vessel layer that traps fission products to prevent escape into the nuclear fuel coolant 170B (e.g., propellant, such as hydrogen) in the NTP nuclear system 100, or interaction with the high-temperature matrix 152.

FIG. 6 illustrates a third interlocking geometry pattern 600 of the insulator element array 112 of insulator elements 102A-N, moderator element array 113 of moderator elements 103A-N, and nuclear fuel tile array 114 of nuclear fuel tiles 104A-N. In the example of FIG. 6, two insulator elements 102A-B, two moderator elements 103A-B, ten nuclear fuel tiles 104A-J, two moderator coolant passages 121A-B, and thirty-two completed fuel coolant passages 141A-N are shown. In the third interlocking geometry pattern 600 of FIG. 6, the respective nuclear fuel tile 104A-J includes two tile interface walls 182A-B and two insulator element interface walls 183A-B. Each of the tile interface walls 182A-B is formed of ten nuclear fuel lateral facets 181A-J and 181M-V, respectively, which are an alternating pattern of a spherical or aspherical surface with a planar surface. Each of the insulator element interface walls 183A-B is formed of two nuclear fuel lateral facets 181K-L and 181W-X, respectively, which are likewise an alternating pattern of a spherical or aspherical surface with a planar surface.

As shown in FIG. 6, the respective insulator element 102A-B is shaped as a prism that includes a respective moderator opening 195A-B formed longitudinally therein. The respective moderator element 103A-B is disposed inside the respective moderator opening 195A-B. The respective insulator element 102A-B includes a plurality of insulator element lateral facets 196A-N (e.g., thirty are shown) that in aggregate shape the respective insulator element 102A-N as the prism, which is a triangular prism in the example. The insulator element lateral facets 196A-N are planar, aspherical, spherical, or freeform surfaces. The prism includes a plurality of insulator element border walls 198A-C, e.g., three insulator element border walls 198A-C are shown in the triangular prism example. Each of the insulator element border walls 198A-C includes a subset of the insulator element lateral facets 196A-N.

The insulator element border walls 198A-C include an alternating pattern of a planar surface with an aspherical or spherical shaped surface. In the example of FIG. 6, ten insulator element lateral facets 196A-J form a first insulator element border wall 198A with the alternating pattern of the planar shaped surface with the aspherical or spherical shaped surface.

Figure 7:
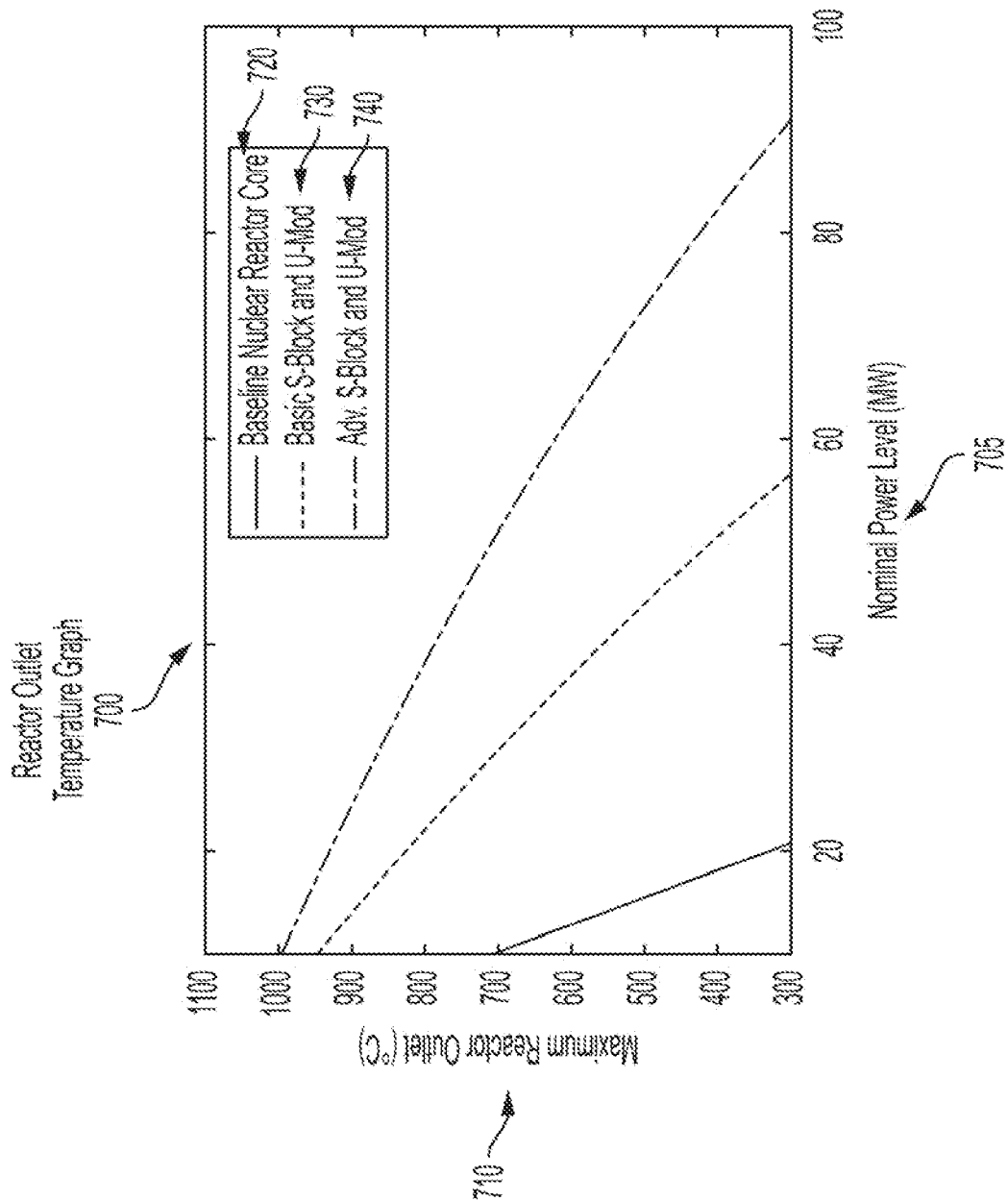
FIG. 7 is a reactor outlet temperature graph illustrating a maximum reactor outlet temperature and a nominal power level.

FIG. 7 is a reactor outlet temperature graph 700 illustrating a maximum reactor outlet temperature 710 in degrees Celsius and a nominal power level 705 in megawatts (MW). Reactor outlet temperature graph 700 compares a baseline nuclear reactor core 720 with an architecture for the nuclear reactor core 101 that implements Basic S-Block and U-Mod 730 like that shown in FIG. 5 and Advanced (Adv.) S-Block and U-Mod 740 like that shown in FIG. 6. As shown in the reactor outlet temperature graph 700, compared to the baseline nuclear reactor core 720, a nuclear reactor core 101 that implements S-Block and U-Mod 730, 740 achieves broader ranges of maximum reactor outlet temperature 710 and nominal power level 705 while maintaining safety, reliability, compactness, and efficiency. As shown, Advanced S-Block and U-Mod 740 can operate either at approximately 70 MWth with outlet temperatures of 500° C., or at 10 MWth, close to 1000° C. Both the Basic S-Block and U-Mod 730 and Advanced S-Block and U-Mod 740 architectures enable better in-nuclear reactor core 101 heat transfer, average nuclear reactor core 101 specific heat, and increase the ability to remove heat from the nuclear reactor core 101.

FIG. 8 is a U-Mod physical property table 800 of two candidate high-temperature thermal insulators 802A-B to form insulator elements 102A-N and six candidate low-temperature solid-phase moderators 803A-F to form moderator elements 103A-N as compared to graphite 810. As shown in the U-Mod physical property table 800, all of the low-temperature solid-phase moderators 803A-F are significantly better neutron moderators than graphite 810 by slowing down power. High-temperature thermal insulators 802A-B are not better neutron moderators than graphite by slowing down power. By combining the high-temperature thermal insulators 802A-B with the low-temperature solid-phase moderators 803A-F, superior engineered performance is achieved by U-Mod. Two engineered structures for U-Mod are superior. In the first engineered U-Mod structure, the moderator elements 103A-N are formed of a solid-phase moderator 803A that includes zirconium hydride (ZrH) 803A that is encased in a rigidly clad high-temperature thermal insulator 802A formed of a nuclear-grade chemical vapor deposition (CVD) SiC composite cladding. In the second engineered U-Mod structure, the moderator elements 103A-N are formed of a solid-phase moderator 803B that includes beryllium carbide ($Be_2C$) 803B that is similarly encased in high-temperature thermal insulator 802A formed of a nuclear-grade SiC composite cladding.

Figure 9:
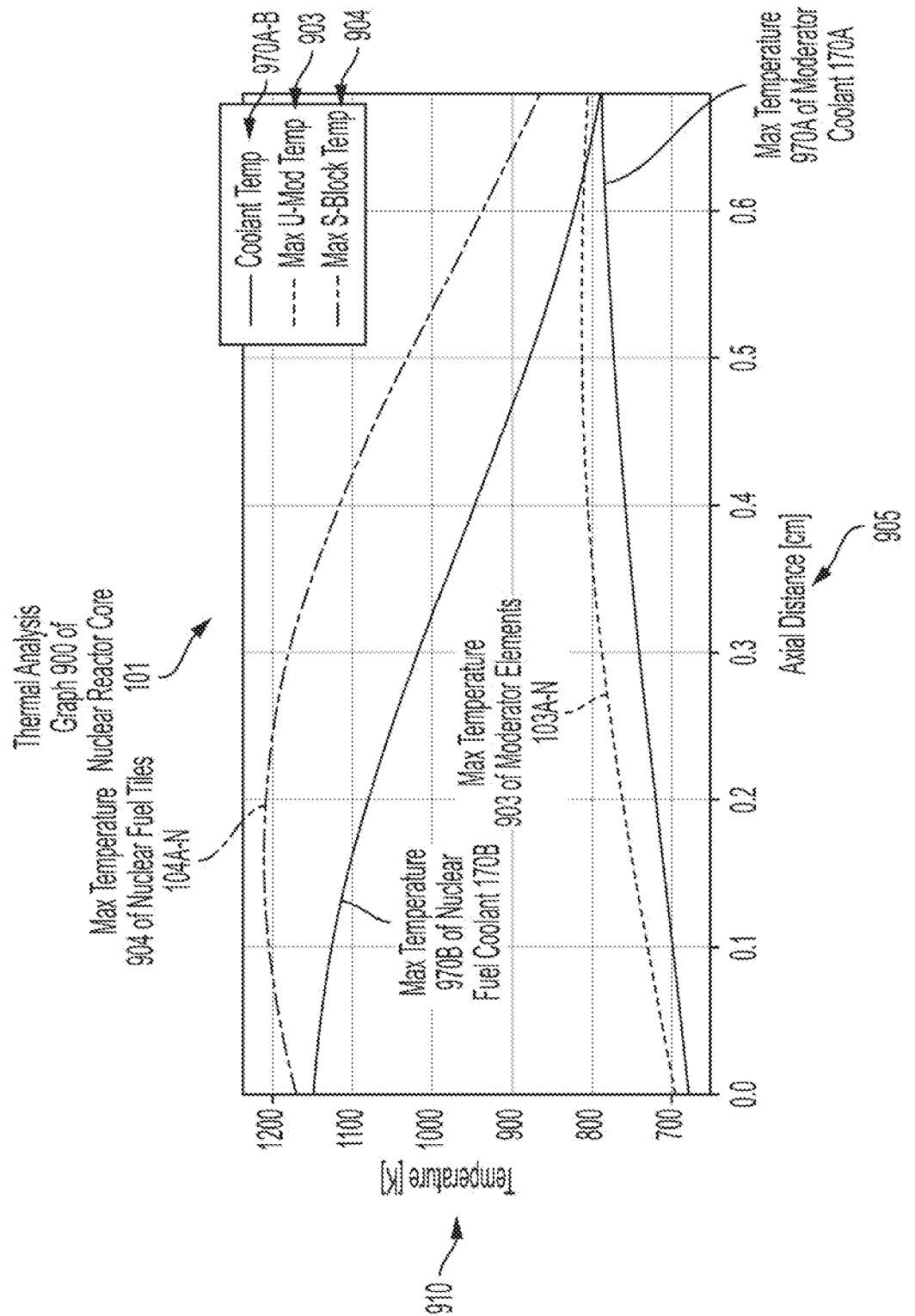
FIG. 9 is a thermal analysis graph of the nuclear reactor core that implements S-Block and U-Mod showing how temperature varies depending on axial distance.

FIG. 9 is a thermal analysis graph 900 of the nuclear reactor core 101 that implements S-Block and U-Mod showing how temperature varies 910 depending on axial distance 905. As shown in the thermal analysis graph 900, the nuclear fuel tile maximum temperature 904 of the nuclear fuel tiles 104A-N(S-Blocks) is approximately 1,200 degrees Kelvin at an axial distance 905 between approximately 0 centimeters to 0.3 centimeters. The nuclear fuel coolant maximum temperature 970B of the nuclear fuel coolant 170B is approximately 1,150 degrees Kelvin at an axial distance 905 between approximately 0 centimeters to 0.1 centimeters. The moderator element maximum temperature 903 of the moderator elements 103A-N (U-Mod) is approximately 800 degrees Kelvin at an axial distance 905 between approximately 0.3 centimeters to 0.7 centimeters. The moderator coolant maximum temperature 970A of the moderator coolant 170A is approximately 750 degrees Kelvin at an axial distance 905 between approximately 0.5 centimeters to 0.7 centimeters. Hence, the S-Block architecture of the nuclear fuel tiles 104A-N increases heat transfer between the nuclear fuel tiles 104A-N to increase efficiency and the U-Mod architecture of the moderator elements 103A-N and the insulator elements 102A-N increases the ability to remove heat from the moderator elements 103A-N.

Figure 10:
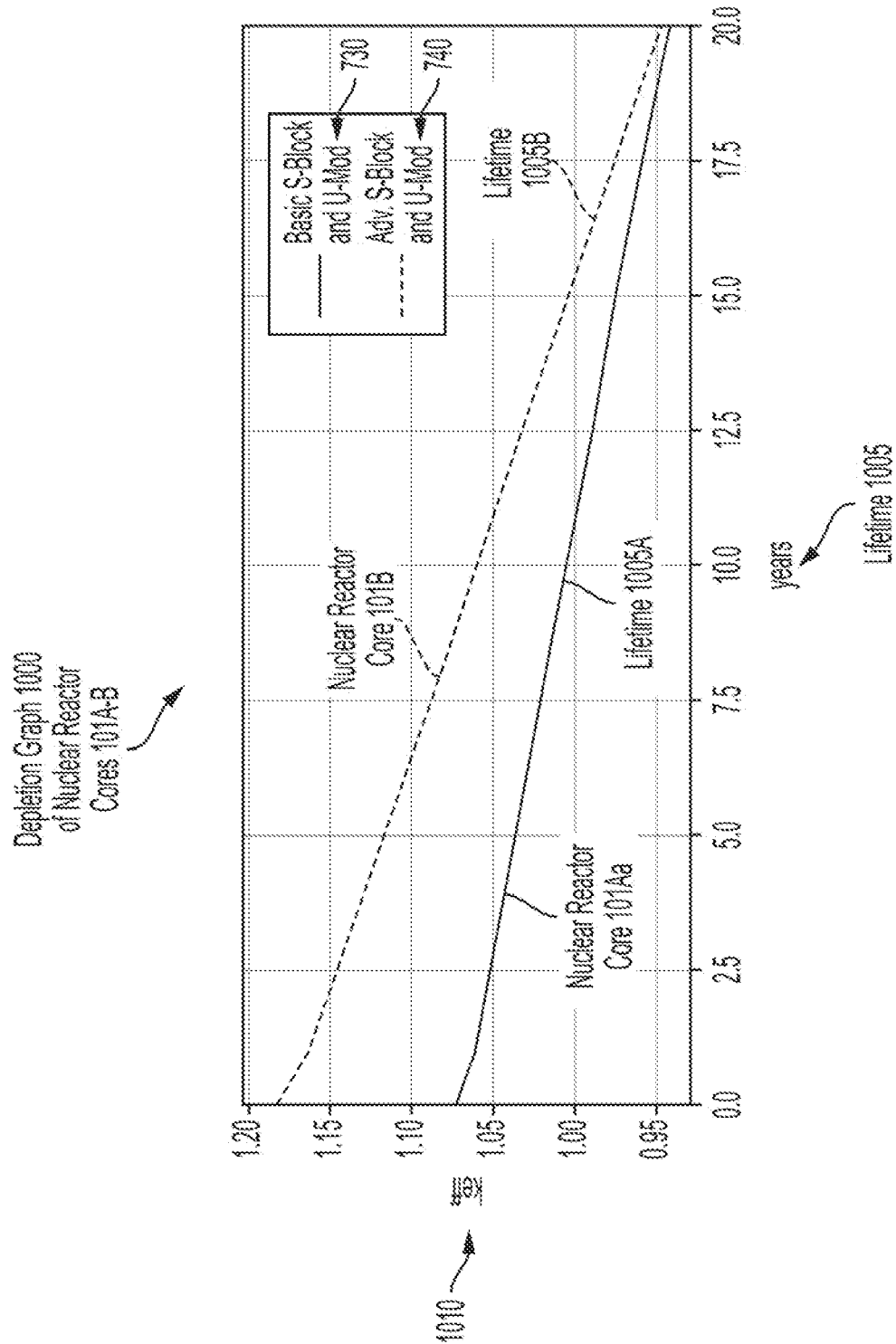
FIG. 10 is a depletion graph of the nuclear reactor core that implements S-Block and U-Mod.

FIG. 10 is a depletion graph 1000 of two different nuclear reactor cores 101A-B that implement S-Block and U-Mod. As shown, the coefficient k-effective (k-eff) 1010 over the lifetime 1005 measured in years of the nuclear reactor core 101 is improved. K-eff 1010, also known as the neutron multiplication factor, characterizes the criticality state of the fissile material in the TRISO fuel particles 151A-N suspended in the high-temperature matrix 152 of the nuclear fuel tiles 104A-N. Generally K-eff=number of neutrons produced/number of neutrons lost (through leakage or absorption). If K-eff 1010 is greater than or equal to 1, only then can the nuclear fission chain reaction be sustained. As shown, Basic S-Block and U-Mod 730 enables a nuclear reactor core 101A with a lifetime 1005A of approximately 10 years. Advanced S-Block and U-Mod 740 enables a nuclear reactor core 101B with a lifetime 1005B of approximately 15 years. Both Basic S-Block and U-Mod 730 and Advanced S-Block and U-Mod 740 enable a large power density rendering the nuclear reactor system 1000 commercially viable.

FIG. 11 is a nuclear reactor core performance and properties comparison table 1101 comparing nuclear reactor mass 1105, power level 1106, power per mass 1107, outlet temperature 1108, and uranium 235 (U-235) enrichment 1109 of six different nuclear reactor systems 1100A-F. As measured by nuclear reactor mass 1105 in kilograms (kg), power level 1106 in kilowatt-electric (kWe), power per mass 1107 in Watts electric per kilogram (We/kg), and outlet temperature 1108 in degrees Kelvin (K), a first nuclear reactor system 1100A that implements Basic S-Block and U-Mod 730 within the nuclear reactor core 101 achieves slightly improved performance compared to the JIMO nuclear reactor system 1100D. Importantly, this slightly improved performance achieved with Basic S-Block and U-Mod 730 is achieved with U-235 enrichment 1109A that is low-enriched uranium (LEU), and not the highly-enriched uranium (HEU) U-235 enrichment implemented in the JIMO nuclear reactor system 1100D. The JIMO nuclear reactor system 1100D is described in National Aeronautics and Space Administration "Prometheus Project Final Report" 982-R120461, the entirety of which is incorporated by reference herein.

A second nuclear reactor system 1100B that implements Advanced S-Block and U-Mod 740 in the nuclear reactor core 101 has a nuclear reactor mass 1105B that is the same as the nuclear reactor mass 1105E of the KiloPower Derived nuclear reactor system 1100C, but Advanced S-Block and U-Mod 740 majorly improves power level 1106B, power per mass 1107B, and outlet temperature 1108B. The KiloPower Derived nuclear reactor system 1100C is described in Patrick McClure, David Poston, "Design and Testing of Small Nuclear Reactors for Defense and Space Applications, Invited Talk to ANS Trinity Section, the entirety of which is incorporated by reference herein.

The nuclear reactor mass 1105A of Basic S-Block and U-Mod 730 is merely 1,500 kg and the nuclear reactor mass 1105B of Advanced S-Block and U-Mod 740 is 3,000 kg. Like S-Block and U-Mod, the Megapower nuclear reactor system 1100F implements LEU U-235 enrichment 1109F; however, the nuclear reactor mass 1105F is nearly 22,000 kilograms with a power per mass 1107F of 91 We/kg compared to an improved power per mass 1107A of 100 We/kg for Basic S-Block and U-Mod 730 and a power per mass 1107B of 333 We/kg for Advanced S-Block and U-Mod 740. The Megapower nuclear reactor system 1100F is also described in Patrick McClure, David Poston, "Design and Testing of Small Nuclear Reactors for Defense and Space Applications," Invited Talk to ANS Trinity Section, the entirety of which is incorporated by reference herein.

Finally, the NASA Fission Surface System nuclear reactor system 1100C is described in David I. Poston, "Reference Reactor Module Design for NASA's Lunar Fission Surface Power System," Proceedings of Nuclear and Emerging Technologies for Space 2009, Atlanta, GA June 2009, the entirety of which is incorporated by reference herein. Overall, the NASA Fission Surface System nuclear reactor system 1100D has inferior performance and properties, including nuclear reactor mass 1105C, power level 1106C, power per mass 1107C, outlet temperature 1108C, and uranium 235 (U-235) enrichment 1109C compared to both Basic S-Block and U-Mod 730 and Advanced S-Block and U-Mod 740 even though the NASA Fission Surface System utilizes HEU U-235 enrichment 1109C.

The nuclear reactor core performance and properties comparison table 1101 of FIG. 11 demonstrates that the S-Block and U-Mod technologies implemented in the architecture of the nuclear reactor core 101 achieve relatively low nuclear reactor mass 1105, high power level 1106, high power per mass 1107, and a high outlet temperature 1108 even with LEU U-235 enrichment. To summarize, S-Block and U-Mod enhance improve safety, reliability, heat transfer, efficiency, and compactness of the nuclear reactor core 101.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," "has," "having," "with," "formed of," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A nuclear reactor system comprising:
 a nuclear reactor core including:
  an insulator element array of insulator elements;
  a plurality of tube liners formed of a hydrogen barrier material;
  a neutron moderator element array of moderator elements, wherein a respective moderator element is formed of a solid-phase moderator disposed inside a respective insulator element; and
 a nuclear fuel tile array of nuclear fuel tiles, wherein a respective nuclear fuel tile includes a plurality of nuclear fuel lateral facets that border the respective insulator element or another respective nuclear fuel tile;
 wherein:
  the respective moderator element is insulated from the nuclear fuel tile array of nuclear fuel tiles by the respective insulator element,
  the respective moderator element is disposed inside a respective tube liner, and
  the respective tube liner is formed as a cladding that sheaths the respective moderator element.

2. The nuclear reactor system of claim 1, further comprising a plurality of moderator coolant passages, wherein:

the respective tube liner is surrounded by a respective moderator coolant passage; and the respective moderator coolant passage is surrounded by the respective insulator element.

3. The nuclear reactor system of claim 2, wherein:
the respective tube liner is between the respective moderator element and the respective moderator coolant passage; and
the respective moderator coolant passage is between the respective tube liner and the respective insulator element.

4. The nuclear reactor system of claim 2, wherein:
the respective insulator element is between the respective moderator coolant passage and the respective nuclear fuel tile.

5. The nuclear reactor system of claim 1, wherein:
the cladding includes a hermetically sealed container; and
the solid-phase moderator material forming the respective moderator element is disposed inside the hermetically sealed container.

6. The nuclear reactor system of claim 1, wherein:
the respective tube liner is formed as a coating on the respective moderator element; and
the solid-phase moderator material forming the respective moderator element is disposed inside the coating.

7. The nuclear reactor system of claim 1, wherein:
the hydrogen barrier material includes $Al_yO_x$, SiC, ZrC, MgO, Mo, W, Cu, Ni, Cr, or a combination thereof.

8. The nuclear reactor system of claim 1, wherein:
each of the insulator elements is formed of a thermal insulator; and
the thermal insulator includes SiC, stabilized zirconium oxide, aluminum oxide, ZrC, carbon, or a combination thereof.

9. The nuclear reactor system of claim 1, wherein:
the solid-phase moderator includes $MgH_x$, $YH_x$, $ZrH_x$, $CaH_x$, $ZrO_x$, $CaO_x$, $BeO_x$, $BeC_x$, Be, enriched boron carbide, $^{11}B_4C$, $CeH_x$, $LiH_x$, or a combination thereof.

10. The nuclear reactor system of claim 1, wherein:
the respective insulator element is shaped as a prism or a cylinder that includes a moderator opening formed longitudinally therein; and
the respective moderator element is disposed inside the moderator opening.

11. The nuclear reactor system of claim 1, wherein:
the respective insulator element includes a plurality of insulator element lateral facets that in aggregate shape the respective insulator element as a prism.

12. The nuclear reactor system of claim 11, wherein:
the respective insulator element is shaped as the prism;
the prism includes a plurality of insulator element border walls; and
each of the insulator element border walls includes a subset of the insulator element lateral facets.

13. The nuclear reactor system of claim 11, wherein:
the insulator element lateral facets are planar, aspherical, spherical, or freeform surfaces.

14. The nuclear reactor system of claim 12, wherein:
the insulator element border walls include an alternating pattern of a planar surface with an aspherical or spherical surface.

15. The nuclear reactor system of claim 11, wherein:
the prism is a triangular prism; and
the respective insulator element includes three insulator element border walls.

16. The nuclear reactor system of claim 1, wherein:
each of the nuclear fuel tiles is formed of a fuel compact comprised of coated fuel particles embedded inside a matrix; and
the matrix includes silicon carbide, zirconium carbide, titanium carbide, niobium carbide, tungsten, molybdenum, or a combination thereof.

17. The nuclear reactor system of claim 16, wherein:
the coated fuel particles includes tristructural-isotropic (TRISO) fuel particles or bistructural-isotropic (BISO) fuel particles.

18. The nuclear reactor system of claim 1, wherein:
the plurality of nuclear fuel lateral facets are discontinuous to form an outer periphery of the respective nuclear fuel tile.

19. The nuclear reactor system of claim 18, wherein:
the outer periphery includes a plurality of planar, aspherical, spherical, or freeform surfaces.

20. The nuclear reactor system of claim 1, wherein:
the nuclear fuel lateral facets alternate between bordering the respective insulator element and the other respective nuclear fuel tile.

21. The nuclear reactor system of claim 1, wherein:
the nuclear fuel lateral facets include a plurality of tile interface walls and a plurality of insulator element interface walls; and
a respective tile interface wall alternates with a respective insulator element interface wall to form an alternating pattern of the outer periphery.

22. The nuclear reactor system of claim 21, wherein:
the respective tile interface wall includes a planar surface.

23. The nuclear reactor system of claim 21, wherein:
the respective tile interface wall includes two nuclear fuel lateral facets with a nuclear fuel lateral facet extending between;
the two nuclear fuel lateral facets include a planar surface; and
the nuclear fuel lateral facet extending between includes an aspherical or spherical surface.

24. The nuclear reactor system of claim 21, wherein:
the respective tile interface wall borders the other respective nuclear fuel tile; and
the respective insulator element interface wall borders the respective insulator element.

25. The nuclear reactor system of claim 21, wherein:
the respective insulator element interface wall includes an aspherical or spherical surface.

26. The nuclear reactor system of claim 21, wherein:
the respective insulator element is shaped as a tube or a pipe; and
the respective insulator element lines the respective insulator element interface wall of two or more nuclear fuel tiles.

27. The nuclear reactor system of claim 1, wherein:
the respective insulator element with the respective moderator element disposed inside includes a respective moderator coolant passage formed therein.

28. The nuclear reactor system of claim 27, wherein:
the respective moderator coolant passage is located between the respective moderator element and the respective insulator element.

29. The nuclear reactor system of claim 27, wherein:
the respective moderator coolant passage is a flattened ring shaped opening.

30. The nuclear reactor system of claim 27, wherein:
the respective moderator coolant passage flows a coolant through to both: (i) heat the coolant, and (ii) cool the respective moderator element;

the respective nuclear fuel tile includes one or more fuel coolant passages formed therein for subsequent heating of the coolant by the respective nuclear fuel tile after the coolant flows through the moderator coolant passage; and the coolant is a gas or a liquid.

31. The nuclear reactor system of claim 27, wherein:

the respective moderator coolant passage flows a moderator coolant through to both: (i) heat the moderator coolant, and (ii) cool the respective moderator element; and the respective nuclear fuel tile includes one or more nuclear fuel coolant passages formed therein that flow a nuclear fuel coolant to heat the nuclear fuel coolant via direct contact with the respective nuclear fuel tile.

32. The nuclear reactor system of claim 31, wherein:

the moderator coolant that flows through the respective moderator coolant passage is in a moderator coolant loop dedicated to the neutron moderator element array of moderator elements and that is thermally isolated and separated from a fuel coolant loop that includes the nuclear fuel coolant passages.

33. The nuclear reactor system of claim 32, wherein:

the moderator coolant loop thermally isolates the moderator coolant from the nuclear fuel coolant to actively remove heat from the moderator elements to maintain the moderator elements at a lower temperature compared to the nuclear fuel tile array of nuclear fuel tiles during operation of the nuclear reactor core.

34. The nuclear reactor system of claim 32, wherein:

the moderator coolant is different than the nuclear fuel coolant.

35. The nuclear reactor system of claim 1, further comprising a turbine and a compressor.

36. The nuclear reactor system of claim 1, further comprising a pump, a compressor, a blower, or a combination thereof.

37. The nuclear reactor system of claim 1, wherein:

the respective moderator element is disposed inside the respective tube liner for hydrogen retention.

38. The nuclear reactor system of claim 1, wherein:

the respective moderator element is disposed inside the respective tube liner for coolant or propellant retention.

\* \* \* \* \*